US008032726B2

(12) United States Patent
Iwamura et al.

(10) Patent No.: US 8,032,726 B2
(45) Date of Patent: Oct. 4, 2011

(54) REMOTE COPY SYSTEM

(75) Inventors: Takashige Iwamura, Yokohama (JP);
Hiroshi Arakawa, Sagamihara (JP);
Kenta Ninose, Yokohama (JP);
Yoshihiro Asaka, Odawara (JP); Yusuke Hirakawa, Odawara (JP)

(73) Assignee: Hitachi, Ltd, Tokyo (JP)

( * ) Notice: Subject to any disclaimer, the term of this patent is extended or adjusted under 35 U.S.C. 154(b) by 346 days.

(21) Appl. No.: 12/206,325

(22) Filed: Sep. 8, 2008

(65) Prior Publication Data
US 2009/0024815 A1 Jan. 22, 2009

Related U.S. Application Data

(63) Continuation of application No. 11/118,927, filed on May 2, 2005, now Pat. No. 7,437,389, and a continuation-in-part of application No. 10/796,175, filed on Mar. 10, 2004, now Pat. No. 7,085,788, and a continuation-in-part of application No. 10/937,731, filed on Sep. 10, 2004, now Pat. No. 7,724,599.

(30) Foreign Application Priority Data

Dec. 3, 2003 (JP) ................. 2003-403970
Jun. 30, 2004 (JP) ................. 2004-192538
Feb. 14, 2005 (JP) ................. 2005-035404

(51) Int. Cl.
*G06F 12/16* (2006.01)

(52) U.S. Cl. ........ 711/162; 711/161; 714/6.23; 714/6.3; 714/6.31

(58) Field of Classification Search .................. 711/162, 711/161; 714/6.3, 6.31, 6.23
See application file for complete search history.

(56) References Cited

U.S. PATENT DOCUMENTS

| 5,404,548 A | 4/1995 | Nishioka |
| 5,553,285 A | 9/1996 | Krakauer et al. |

(Continued)

FOREIGN PATENT DOCUMENTS
EP        0674263        9/1995
(Continued)

OTHER PUBLICATIONS

"SRDF/Asynchronous: A Technical Description", EMC White Paper, EMC Corporation, Feb. 2004, pp. 1-13.

(Continued)

*Primary Examiner* — Jae Yu
(74) *Attorney, Agent, or Firm* — Brundidge & Stanger, P.C.

(57) ABSTRACT

A remote copy system includes a plurality of first storage systems and a plurality of second storage systems. Each first storage system assigns a sequential number to write data received from the host and sends the write data with the sequential number to the second storage system. One of the first storage systems defers the processing of the write request received from the host and instructs each of the first storage systems to create a marker, whereupon each of the first storage systems defers the processing of the write request, creates a marker including a sequential number and having a marker number, and sends the marker to the second storage system. Each of the second storage systems, when receiving a marker from the first storage system, stores the marker number included in the marker. One of the second storage systems reads the marker number stored by each of the second storage systems and reports to each of the second storage systems the marker number of smallest value of the marker numbers which were thus read. Each of the second storage systems writes to a logical volume in sequential number order write data, of the write data received from the first storage system, that includes a sequential number of a value smaller than the sequential number of the marker including the marker number reported from one of the second storage systems.

8 Claims, 25 Drawing Sheets

U.S. PATENT DOCUMENTS

| | | |
|---|---|---|
| 5,603,003 A | 2/1997 | Akizawa |
| 5,623,599 A | 4/1997 | Shomler |
| 5,657,440 A | 8/1997 | Micka et al. |
| 5,734,818 A | 3/1998 | Kern et al. |
| 5,890,156 A | 3/1999 | Rekieta et al. |
| 5,996,054 A | 11/1999 | Ledain et al. |
| 6,421,688 B1 | 7/2002 | Song |
| 6,460,055 B1 | 10/2002 | Midgley et al. |
| 6,463,501 B1 | 10/2002 | Kern et al. |
| 6,493,796 B1 | 12/2002 | Arnon et al. |
| 6,553,387 B1 | 4/2003 | Cabrera et al. |
| 6,898,685 B2 | 5/2005 | Meiri et al. |
| 2002/0078296 A1 | 6/2002 | Nakamura |
| 2003/0050930 A1 | 3/2003 | Mosher, Jr. et al. |
| 2003/0078903 A1 | 4/2003 | Kimura |
| 2003/0191916 A1* | 10/2003 | McBrearty et al. .......... 711/162 |
| 2004/0078399 A1 | 4/2004 | Tabuchi et al. |
| 2004/0172509 A1 | 9/2004 | Takeda et al. |
| 2004/0193802 A1 | 9/2004 | Meiri et al. |
| 2004/0193816 A1 | 9/2004 | Meiri et al. |
| 2004/0205312 A1* | 10/2004 | Zlotnick et al. ............... 711/162 |
| 2004/0250030 A1 | 12/2004 | Ji |
| 2004/0250031 A1 | 12/2004 | Ji |
| 2004/0260972 A1 | 12/2004 | Ji |
| 2004/0267829 A1 | 12/2004 | Hirakawa et al. |
| 2004/0268177 A1 | 12/2004 | Ji |
| 2005/0033828 A1 | 2/2005 | Watanabe |
| 2005/0066122 A1 | 3/2005 | Longinov et al. |
| 2005/0091415 A1 | 4/2005 | Armitano |
| 2005/0102554 A1 | 5/2005 | Zohar |
| 2005/0120056 A1 | 6/2005 | Meiri et al. |
| 2005/0120092 A1 | 6/2005 | Nakano |
| 2005/0125617 A1 | 6/2005 | Ninose et al. |
| 2005/0132248 A1 | 6/2005 | Lecrone et al. |
| 2005/0149666 A1 | 7/2005 | Meiri et al. |
| 2005/0149817 A1 | 7/2005 | Biran et al. |
| 2005/0198454 A1 | 9/2005 | Yoder et al. |

FOREIGN PATENT DOCUMENTS

| | | |
|---|---|---|
| EP | 1150210 | 10/2001 |
| EP | 1217523 | 6/2002 |
| EP | 1538527 | 6/2005 |
| EP | 0672985 | 9/2005 |
| JP | 06-149485 | 5/1994 |
| JP | 6149485 | 5/1994 |
| JP | 7244597 | 9/1995 |
| JP | 11039744 | 2/1999 |
| JP | 11313210 | 11/1999 |
| JP | 2001282628 | 10/2001 |
| JP | 2002290742 | 10/2002 |
| JP | 2003167684 | 6/2003 |
| JP | 2004259079 | 9/2004 |
| WO | 01/16748 | 3/2001 |
| WO | 2005/031578 | 4/2005 |

OTHER PUBLICATIONS

"The Role of Backup in Data Recovery", Storage.com, pp. 1-3, 2005.

* cited by examiner

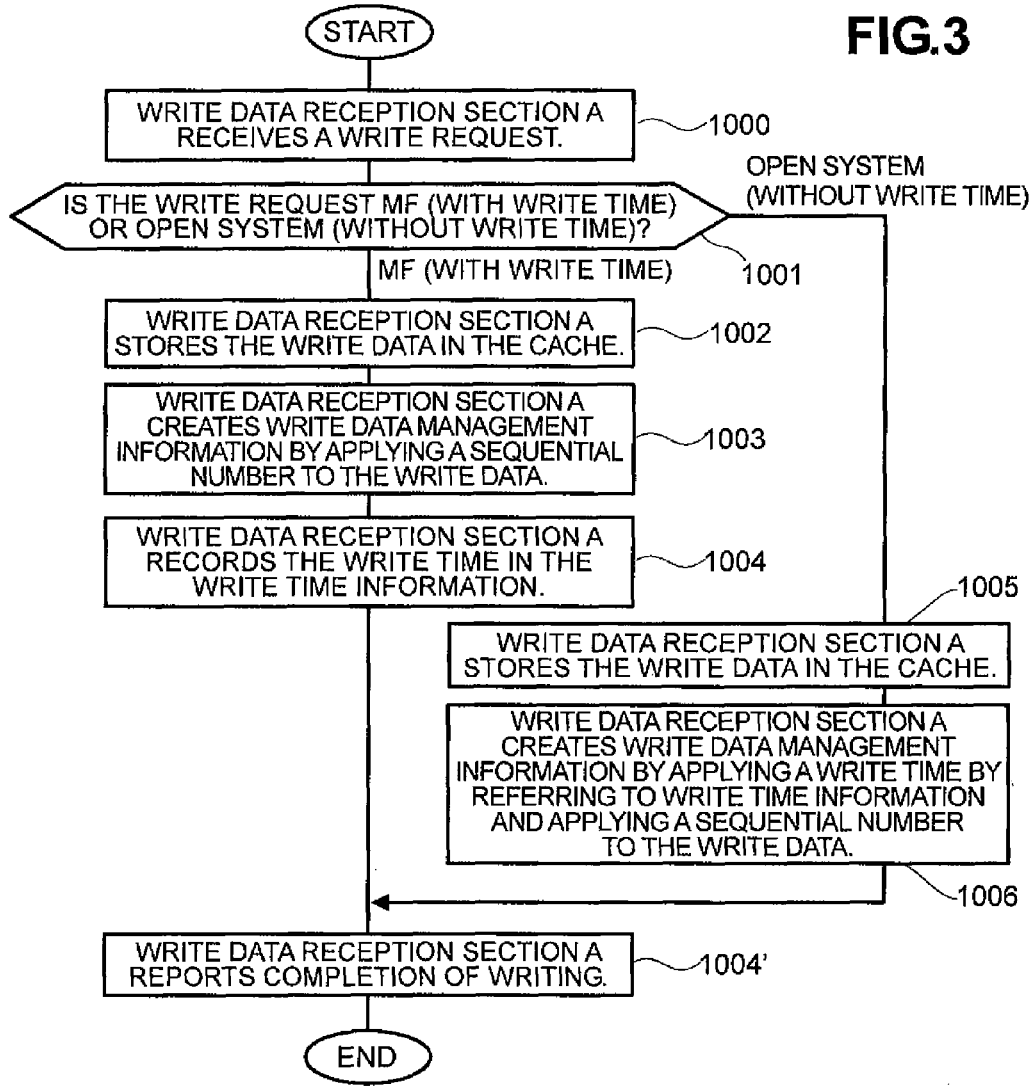
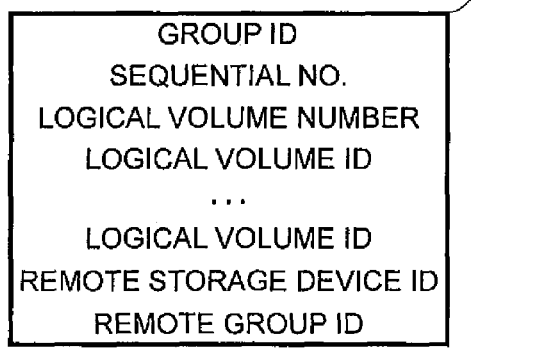

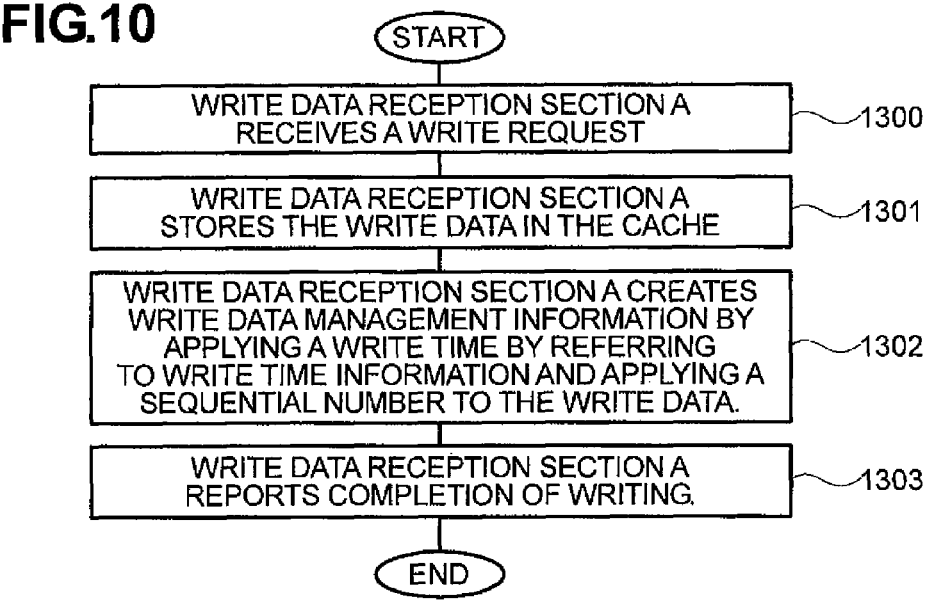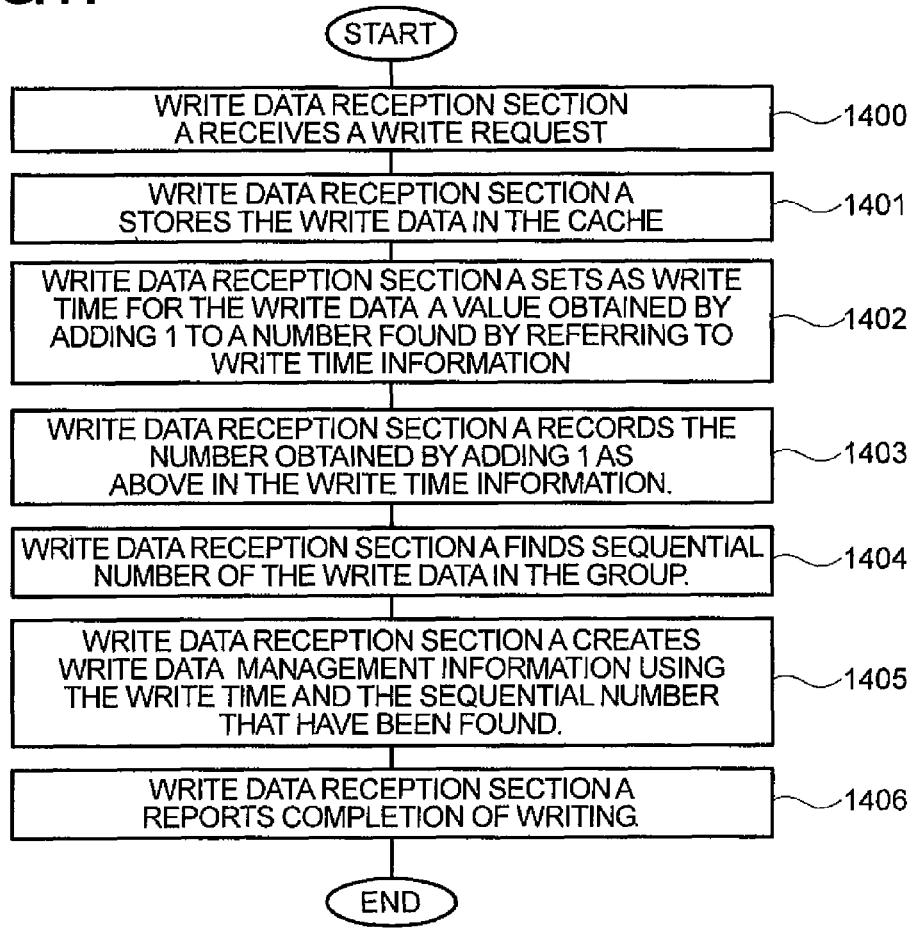

REMOTE COPY SYSTEM

CROSS REFERENCE

The above-referenced patent application is a continuation application of U.S. Ser. No. 11/118,927, filed May 2, 2005 now U.S. Pat. No. 7,437,389 which is hereby incorporated by reference into this application.

This application is a continuation-in-part application of U.S. Ser. No. 10/796,175 filed on Mar. 10, 2004 now U.S. Pat. No. 7,085,788.

This application is a continuation-in-part application of U.S. Ser. No. 10/937,731 filed on Sep. 10, 2004 now U.S. Pat. No. 7,724,599.

This application relates to and claims priority from Japanese Patent Application No. JP2004-192538, filed on Jun. 30, 2004, the entire disclosure of which is incorporated herein by reference.

This application relates to and claims priority from Japanese Patent Application No. JP2005-035404, filed on Feb. 14, 2005, the entire disclosure of which is incorporated herein by reference.

BACKGROUND

The present invention relates to a storage system that stores data that is employed by a computer and that receives updating of data from a computer, and in particular relates to processing for maintaining copies of data between a plurality of storage systems.

In Laid-open European Patent Application No. 0672985, a technique is disclosed whereby the data that is employed by a computer is stored by a storage system and a copy of this data is stored in a separate storage system arranged at a remote location, while reflecting the write sequence of the data. In the processing indicated in Laid-open European Patent Application No. 0672985, the source storage system that has received the write data from the primary host computer reports completion of reception of the write data to the primary host computer only after reception of the write data. After this, the primary host computer reads a copy of the write data from the source storage system. A write time, which is the time at which the write request in respect of the write data was issued, is applied to this write data and, when the write data is read by the primary host computer, the write time is also transferred to the primary host computer. In addition, the primary host computer transfers the write data and the write time to the secondary host computer. After receiving the write data and the write time, the secondary host computer writes information including the write time to a control volume in the storage system on the secondary side and, in addition, writes the write data in the target storage system in the write time sequence, with reference to the write times at which the various items of write data were presented. By writing the write data in the target storage system in the write time sequence, it is possible to maintain consistent data in the target storage system.

If write data were to be reflected to the target storage system neglecting the write sequence (the operation of storing write data in the target storage system will hereinbelow be referred to as "reflecting" the data), for example in the case of a bank account database, in processing to transfer funds from an account A to an account B, it would not be possible to reproduce the debiting of the account A and the crediting of the account B as a single transaction and it would be possible for example for a period to occur in the target storage system in which the balance of the account B was credited before debiting of the balance of the account A. If, in this case, some fault occurred in the source storage system rendering it unusable prior to debiting the balance of the account A in the target storage system, mismatching data would be left in the target storage system, with the result that incorrect processing would be performed if business were to be subsequently continued using the secondary host computer. Consequently, by storing the write data in the target storage system preserving the write sequence, consistent data can be maintained, making it possible to guarantee correctness of a sequence of related operations in respect of related data.

U.S. Pat. No. 6,092,066 discloses a technique whereby the data that is used by a computer is stored in a storage system and, by copying the data that is stored in this storage system to a separate storage system arranged at a remote location, the data can be maintained in the separate storage system even if the first storage system has become unusable due to for example a natural disaster or fire.

U.S. Pat. No. 6,209,002 discloses a technique whereby data employed by a computer is stored in a storage system and, by copying the data that is stored in this storage system to a separate storage system arranged at a remote location, and additionally copying the data that has been received by this separate storage system to a third storage system, a high level of redundancy can be obtained in respect of data.

SUMMARY

In the technique that is disclosed in Laid-open European Patent Application No. 0672985, consistency of the copy of data stored in the target storage system cannot be maintained unless the host computer applies a write time to the write data, since the write sequence is maintained using the write time applied to the write data by the host computer when the write data from the host computer is reflected to the target storage system. In the case of a so-called mainframe host computer, the write time is applied to the write request, but, in the case of a so-called open system host computer, the write time is not applied to the write request. Consequently, in the technique disclosed in Laid-open European Patent Application No. 0672985, consistency of the copy of the data stored in the target storage system with I/O from an open system host computer cannot be maintained.

Also in the case of U.S. Pat. Nos. 6,092,066 and 6,209,002, there is no disclosure concerning maintenance of consistency of a copy of data stored in a target storage system when the host computers include an open system host computer.

Accordingly, in a computer system in which data that is employed by computer is stored in a storage system and the data that is stored in this storage system is transferred to a separate storage system so that a copy of the data is also held in this separate storage system, there is herein disclosed a technique for maintaining consistency of the copy of the data stored in the separate storage system (i.e. the target storage system) even in respect of data written to the storage system by a host computer that does not apply a write time to the write data, such as an open system host computer.

The system comprises a first storage device system having a first logical volume coupled to a computer and in which data received from the computer is stored and a second storage device system coupled to the first storage device system and having a second logical volume in which a copy of data stored in the first logical volume is stored.

The first storage device system applies time information to the write data received from the computer and sends the write data and this time information to the second storage device system; the second storage device system stores the write data received from the first storage device system in the second logical volume in accordance with the time information applied to this write data.

In a computer system in which data that is employed by computer is stored in a storage system and the data that is stored in this storage system is transferred to a separate storage system so that a copy of the data is also held in this separate storage system, it is thereby possible to maintain consistency of the copy of the data that is stored in the separate storage system (target storage system), even in the case of data stored in the storage system by a host computer that does not apply the write time to the write data, such as an open system host computer.

BRIEF DESCRIPTION OF THE DRAWINGS

FIG. 3 is a flow diagram showing an example of processing in the case where a write request is received by a storage device A;

FIG. 4 is a view showing an example of group management information;

FIG. 10 is a flow diagram showing another example of processing in the case where the storage device A has received a write request;

FIG. 11 is a flow diagram showing another example of processing in the case where the storage device A has received a write request;

DESCRIPTION OF THE PREFERRED EMBODIMENTS

Embodiments of the present invention are described below. However, it should be noted that the present invention is not restricted to the embodiments described below.

Embodiment 1

Figure 1:
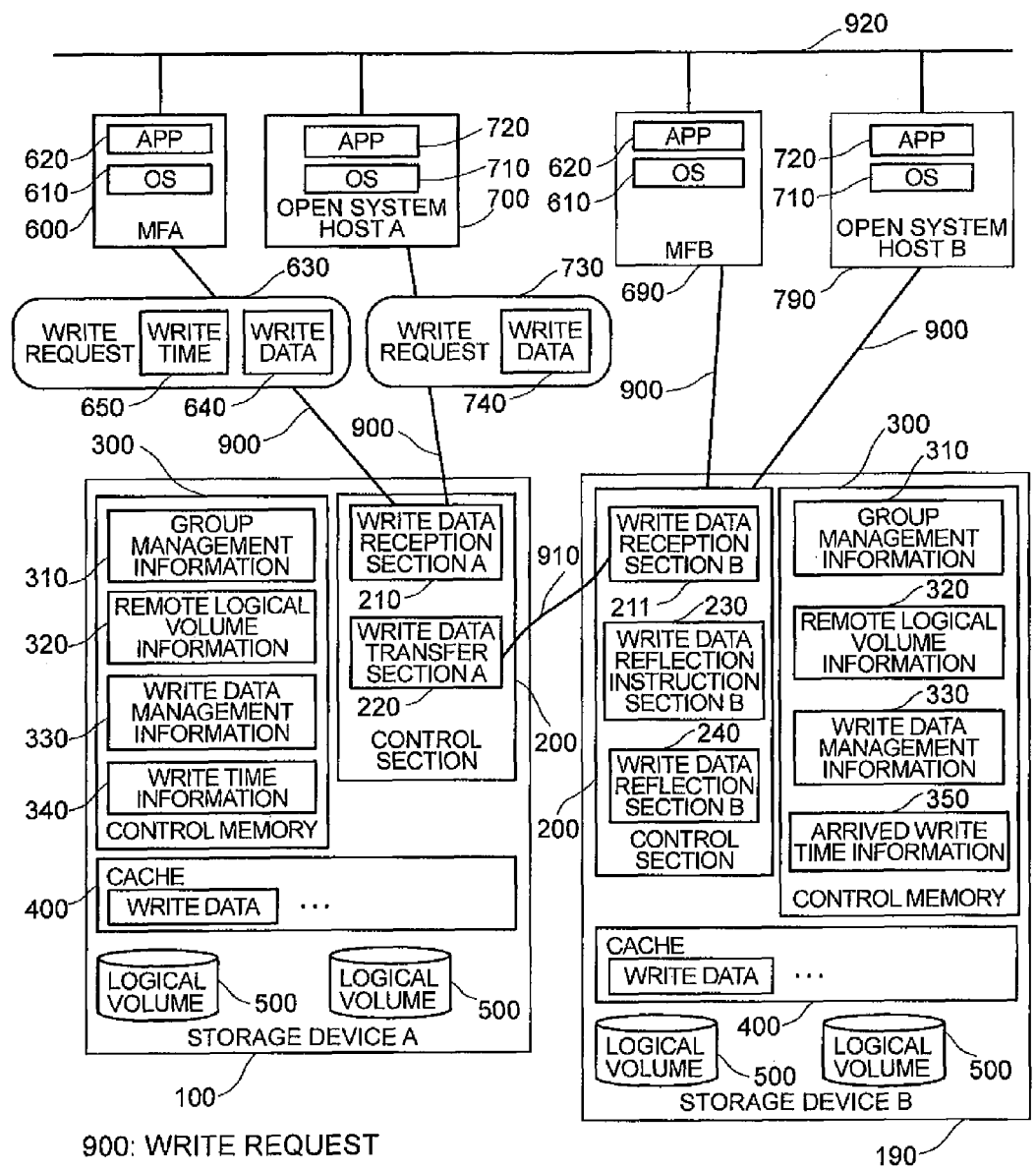
FIG. 1 is a view showing an example of the layout of a computer system according to embodiment 1.

FIG. 1 is a view showing an example of the layout of a computer system according to a first embodiment.

This system comprises a storage device (also referred to as a storage system) A100, a mainframe host computer A (also called MFA) 600, an open system host computer A700, a storage device B190, a mainframe host computer B (also referred to as MFB) 690 and an open system host computer B790. The storage devices A 100 and MFA 600 and the open system host A 700 are respectively connected by I/O paths 900. The storage device B 190 and MFB 690 and open system host B 790 are also respectively connected by I/O paths 900. The MFB 690 and open system host B 790 are normally a standby system. The MFA 600, MFB 690 and open system host A 700 and open system host B 790 are connected by a network 920.

The MFA 600 and MFB 690 include an OS 610 and application software (APP) 620. Also, the open system host A 700 and open system host B 790 likewise include an OS 710 and APP 720. An I/O request issued from the APP of the MFA 600, MFB 690, open system host A 700, or open system host B 790 through the OS is issued to the storage device A 100 or storage device B 190 through the I/O path 900. In this case, software such as a DBMS is included in the APP 620 or APP 720.

The storage device A 100 comprises a control section 200, control memory 300 and cache 400. The control section 200 comprises a write data reception section A 210 and write data transfer section A 220. The control section 200 accesses the control memory 300 and performs the following processing, utilizing the information stored in the control memory 300. The cache 400 comprises high-speed memory that chiefly stores the read data or write data so that the storage device A can achieve a high I/O processing performance by employing the cache 400. It should be noted that, preferably, these components are duplicated and provided with back-up power sources, for purposes of fault resistance and availability.

The storage device B 190 also comprises a control section 200, control memory 300 and cache 400. The control section 200 comprises a write data reception section B 211 and write data reflection instruction section 230 and write data reflection section 240. The role of the control memory 300 and cache 400 is the same as in the description of the storage device A 100 above.

The storage device A 100 and storage device B 190 provide logical volumes 500 constituting data storage regions in respect of the MFA 600, open system host A 700, MFB 690 and open system host B 790. It is not necessary that a single logical volume 500 should constitute the single physical device; for example it could be constituted by a set of storage regions dispersed on a plurality of magnetic disc devices. Also, a logical volume may have for example a mirror construction or a construction that has redundancy such as for example a RAID construction, in which parity data is added.

The storage device A 100 provides a logical volume 500 as described above; however, in the case of the MFA 600 and open system host A 700, the type of logical volume 500 that is provided is different from that provided in the case of the storage device A 100; also, the logical and/or physical interfaces of the I/O paths 900 are different. The same applies to the storage device B 190, MFB 690 and open system host B 790. The time of the write request 630 is included in the write request 630 from the MFA 600 as the write time 650 but is not included in the write request 730 from the open system host A 700.

The storage device A 100 and the storage device B 190 are connected by transfer paths 910. As will be described, the storage device A 100 and the storage device B 190 can hold a copy of the content of one logical volume in another logical volume. In this embodiment, a copy of the content of the logical volume 500 of the storage device A 100 is held in the logical volume 500 of the storage device B 190; the content of the updating performed on the logical volume 500 of the storage device A 100 is also stored in the logical volume 500 of the storage device B 190 by being sent to the storage device B 190 through the transfer path 910. As will be described, the storage device A 100 and the storage device B 200 hold management information regarding the copy, indicating the relationship between the logical volumes and maintenance of the copy referred to above is performed by using this management information. The relationship between the logical volumes and the relationship of the logical volume groups, to be described, is set by the user in accordance with the user's needs.

Figure 2:
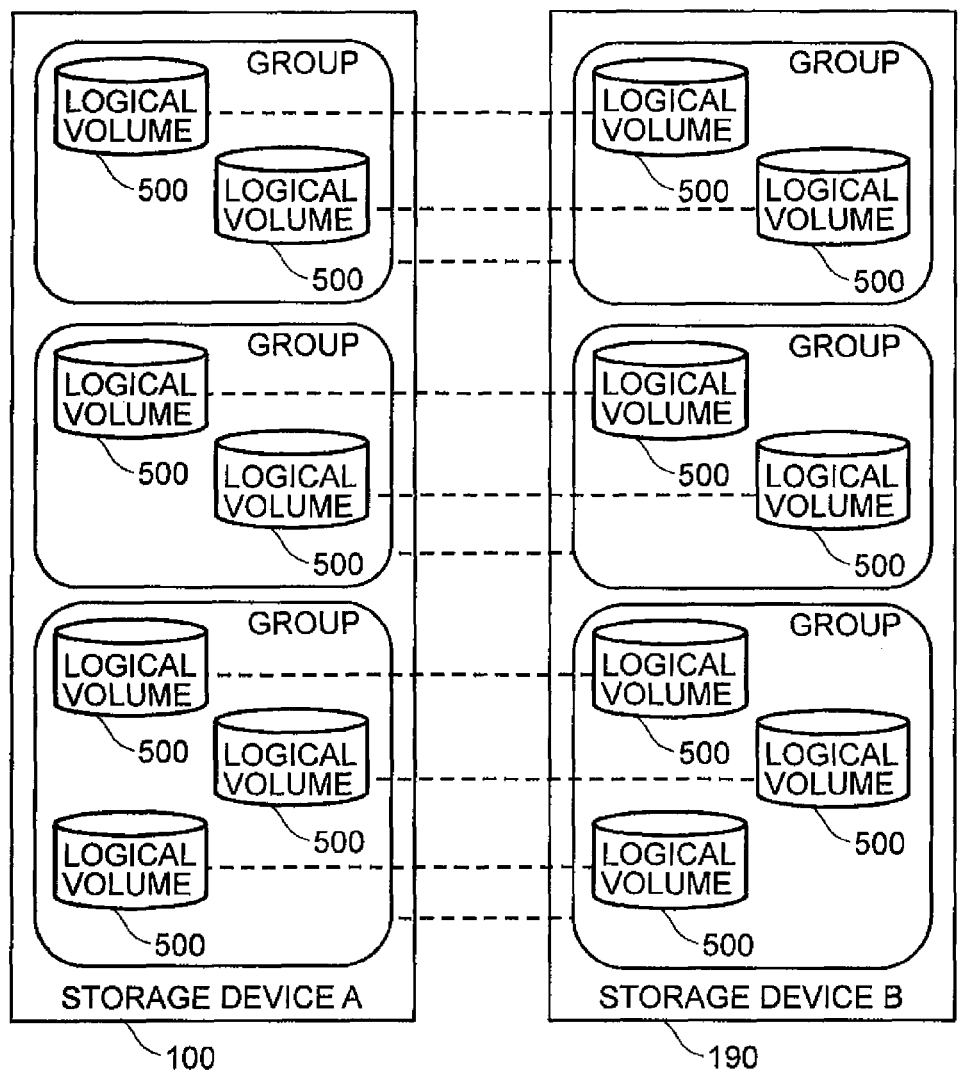
FIG. 2 is a diagram showing an example of a logical volume group.

In this embodiment, the relationships between the logical volumes are grouped. FIG. 2 is a diagram showing an example of a group of logical volumes. The broken lines indicate the copy relationship between the logical volumes 500 or between the logical volume groups i.e. the correspondence relationship of the source and target. In this embodiment, the sequence of write data in the storage device A 100 and reflection in the storage device B 190 are managed in units of logical volume groups comprising a plurality of such logical volumes and allocation of the necessary resources for processing as described above is also performed in units of logical volume groups.

If these are performed for each of the individual logical volumes, the large number of items to be managed makes the management process complicated and there is also a possibility of the resources required for this processing being increased, due to the large number of items to be processed. On the other hand, if the entire storage device A 100 is treated as a unit, detailed management can no longer be performed. In particular, since demands such as performance in regard to the logical volumes 500 differ greatly between a mainframe host and an open system host, it is desirable to arrange for example for manual control operations from the user in regard to processing and setting such as of tuning conditions to be accepted separately, by arranging for such hosts to perform processing separately, divided into respective groups. By setting up logical volume groups in this way, flexible copy processing management can be provided in response to the requirements of users or businesses.

Next, processing of writing of data onto each logical volume 500, transfer of data to a storage device B 190 and processing for reflection of data in the storage device B 190 will be described for the case where the logical volumes 500 that are used by the MFA 600 and the open system host A 700 are arranged to belong to different logical volume groups. By means of these processes, reflection to a copy is performed in write sequence between the various logical volumes of the storage device A 100 and, regarding consistency between copies, it is arranged that mutual consistency can always be maintained between the mainframe host data and open system host data.

FIG. 3 is a view showing the processing that is performed in the case where a write request is received from the MFA 600 or open system host A 700 in respect of a logical volume 500 (logical volume 500 constituting the source) where a copy of the logical volume 500 is being created. The write data reception section A 210 receives a write request from the MFA 600 or open system host A 700 (step 1000). If the write time 650 is included in the write request that is received (step 1001), the write data reception section A 210 stores the write data in the cache 400 (step 1002) and creates (step 1003) write data management information 330 by applying (assigning) a sequential number to the write data. The write data reception section A 210 then records the write time 650 in the write data management information 330. Also, when the sequential number is applied, the write data reception section A 210 obtains the sequential number from the group management information 310 of the logical volume group to which the logical volume that is being written belongs and records a value obtained by adding 1 thereto in the write data management information 330 as the sequential number of the write data, and records this new sequential number in the group management information 310.

FIG. 4 is a view showing an example of group management information 310 of the various logical volume groups. The group ID is the ID for identifying a logical volume group in the storage device A 100. The sequential numbers are numbers that are continuously given to write data in respect of a logical volume belonging to the logical volume group in question. Numbers successively increased by 1 in each case are applied to such write data, the initial value being for example 0. The logical volume number is the number of the logical volume that belongs to the logical volume group in question. The logical volume number is the ID of the logical volume belonging to the logical volume group in question in the storage device A 100. The remote storage device ID has a logical volume group that is paired with the logical volume group in question and is an ID (e.g. serial number) that specifies the storage device (in this embodiment, the storage device B 190) where a copy of the content of the logical volume belonging to the logical volume group in question is stored. The remote group ID is an ID that specifies the logical volume group that is paired with the logical volume group in question in the remote storage device (storage device B 190) i.e. the logical volume group to which the logical volume 500 (also called the remote logical volume) belongs in which a copy of the content of the logical volume belonging to the logical volume group in question is stored.

Figure 5:
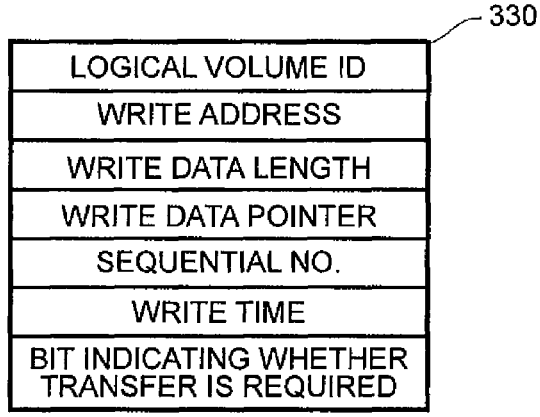
FIG. 5 is a view showing an example of write data management information for managing write data.

FIG. 5 is a view showing an example of write data management information 330 for managing the various write data. The logical volume ID is the ID of the logical volume in which the write data is stored. The write address is the write start address of the write data in question in the aforesaid logical volume. The write data length is the length of the write data in question. The write data pointer is the storage start address of the write data in question in the cache 400. The sequential numbers are numbers that are continuously given to write data in the logical volume group and to which the logical volume belongs in which the write data is written. The write time will be discussed below. The "transfer required" bit is a bit that indicates whether or not the write data in question needs to be transferred to the storage device B and is set to ON when write data management information 330 is created by receipt of write data by the write data reception section A 210. The write data management information 330 is managed in the form of a list for example for each logical volume group.

Returning to FIG. 3, in step 1004, the write data reception section A 210 records the write time 650 as the write time information 340 in the control memory 300.

If, in step 1001, no write time is included in the write request, the write data reception section A 210 stores the write data in the cache 400 (step 1005) and obtains from the write time information 340 a write time, which it applies (assigns) to the write data, and creates write data management information 330 (step 1006) by applying a sequential number obtained from the group management information 310. At this time, the write data reception section A 210 then records the time at which the write time information 340 was recorded, as the write time of the write data management information 300, and finds a sequential number by the same procedure as in the case of step 1003 described above and records this sequential number in the write data management information 300.

Finally, in step 1007, completion of writing is reported to the MFA 600 or to the open system host A 700. The aforesaid processing does not include the time-consuming processing of physically writing the write data that is stored in the cache 400 to the recording medium of the logical volume 500 or of transferring the write data to the storage device B 190; this processing is performed subsequently in asynchronous fashion, with an appropriate timing. Consequently, the time required until reporting of completion of writing after receiving the write request by the write data reception section A 210 need only be a short time, so rapid response to the MFA 600 or open system host A 700 can be achieved.

Figure 6:
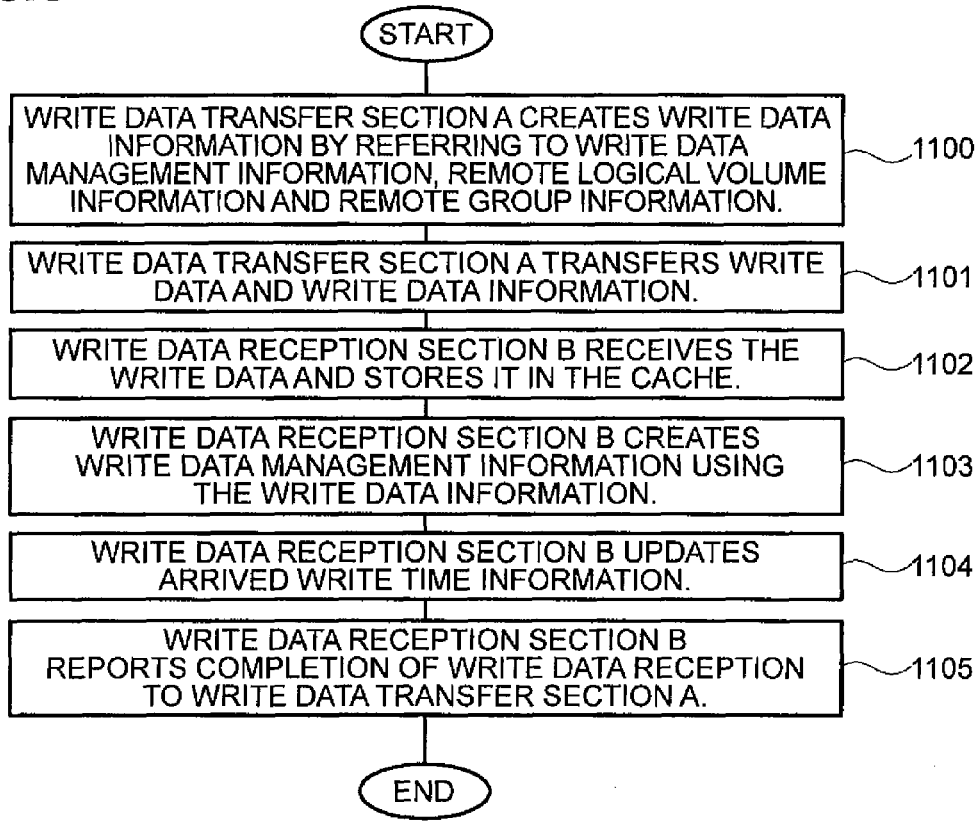
FIG. 6 is a flow diagram showing an example of transfer processing of write data from the storage device A to a storage device B.

FIG. 6 is a view showing an example of transfer processing of write data to the storage device B 190 from the storage device A 100. The write data transfer section A 220 finds (step 1100) the information relating to the write data that is transferred to the storage device B 190 by referring to the list of the write data management information 330 to find the write data that needs to be transferred and, in addition, referring to the write data management information 330, group management information 310 and remote logical volume information 320. This information includes the write address acquired from the write data management information 330, the write data length, the sequential number, the write time, the remote storage device ID acquired from the remote logical volume information 320, the remote logical volume number, and the remote group number obtained from the group management information 310 using the logical volume ID.

Figure 7:
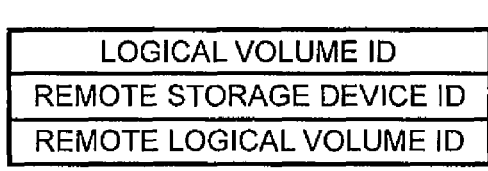
FIG. 7 is a view showing an example of remote logical volume information of a logical volume.

FIG. 7 is a view showing an example of the remote logical volume information 320 of the various logical volumes. The logical volume ID is the ID of the logical volume on the source side (logical volume 500 included in the storage device A 100 in embodiment 1). The remote storage device ID is an ID (for example a serial number) specifying the storage device (storage device B 190 in embodiment 1) having the logical volume (also called the remote logical volume) in which is stored a copy of the data stored by the logical volume in question that is paired with the logical volume in question. The remote logical volume ID is an ID that specifies the remote logical volume (i.e. the logical volume 500 on the target side, where a copy of the data that was stored in the logical volume is stored) in the remote storage device (storage device B 190 in embodiment 1).

Next, returning to FIG. 6, the write data transfer section A 220 transfers (step 1101) to the storage device B 190 the write data and the information found in step 1100. The write data reception section B 211 of the storage device B stores (step 1102) the received write data and information in the cache 400 and creates (step 1103) write data management information 330 from the received information. The items of the write data management information 330 of the storage device B 190 are the same as the items of the write data management information 330 of the storage device A 100. The content of the write data management information 330 of the storage device B 190 differs from that of the write data management information 330 of the storage device A 100 in that the logical volume ID is the ID of the logical volume 500 on the target side where the copy is stored and the write data pointer is the storage start address of the write data in the cache 400 of the storage device B 190 and the "transfer needed" bit is normally OFF, but is otherwise the same.

The storage device B 190 also has group management information 310, but the items thereof are the same as in the case of the storage device A 100. Regarding the content of the group management information 310, the group ID is an ID that specifies the logical volume group to which the logical volume 500 on the side of the target where the copy is stored belongs, the remote storage device ID is the ID of the storage device (storage device A 100 in the case of embodiment 1) constituting the source and the remote group ID is an ID that specifies the logical volume group to which the remote logical volume (i.e. the logical volume 500 constituting the source) belongs in the remote storage device (storage device A 100 in embodiment 1). The storage device B 190 also has remote logical volume information 320, but the items thereof are the same as in the case of the storage device A 100 and, regarding its content, the logical volume ID is an ID that specifies the logical volume 500 where the copy is stored, the remote storage device ID is an ID that specifies the ID of the storage device (storage device A 100) constituting the source and the remote logical volume ID is an ID that specifies the remote logical volume (logical volume 500 constituting the source) in the remote storage device (storage device A 100).

Returning to FIG. 6, next, the write data reception section B 211 updates the arrived write time information 350 (step 1104).

Figure 8:
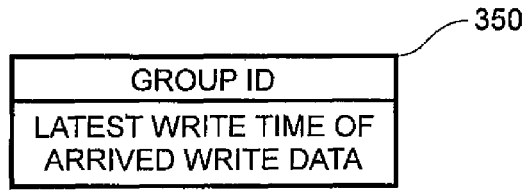
FIG. 8 is a view showing an example of arrived write time information.

FIG. 8 is a view showing an example of arrived write time information 350 of the various groups. The group ID is an ID that specifies the logical volume group in the storage device B 190. The latest write time of the arrived write data is the latest time closest to the current time, of the write times applied to the write data received by the write data reception section of B 211, in respect of the logical volume groups of the storage device B 190. However, if it appears, from the sequential number order, that some of the write data has not yet arrived (some of the sequence of write data is missing), the latest time of the write time applied to these items of write data is recorded as the arrived write data time information, taking the continuous time comparison range in the order of the sequential numbers as being up to the final write data (write data immediately preceding the missing data).

In transfer of the write data between the write data transfer section A 220 and the write data reception section B 211, a plurality of items of write data may be simultaneously transferred in parallel. The write data is therefore not necessarily received in the write data reception section B 211 in the order of the sequential numbers but, as will be described, the write data is reflected in the order of the sequential numbers to each of the logical volume groups (i.e. it is stored in the logical volumes of the storage device B 190), so the write data is reflected to the copy in the order of updating (i.e. in the order of writing of the write data in the storage device A 100).

Returning once more to FIG. 6, finally, the write data reception section B 211 reports completion of reception of the write data to the write data transfer section A 220 (step 1105). The write data transfer section A 220 of the storage device A 100 that has received this write data turns the "transfer required" bit of the write data management information 330 OFF in respect of the write data corresponding to the report of completion of reception of write data. At this time, the storage device A 100 may discard from the cache the arrived write data that was held for transfer to the storage device B 190.

Figure 9:
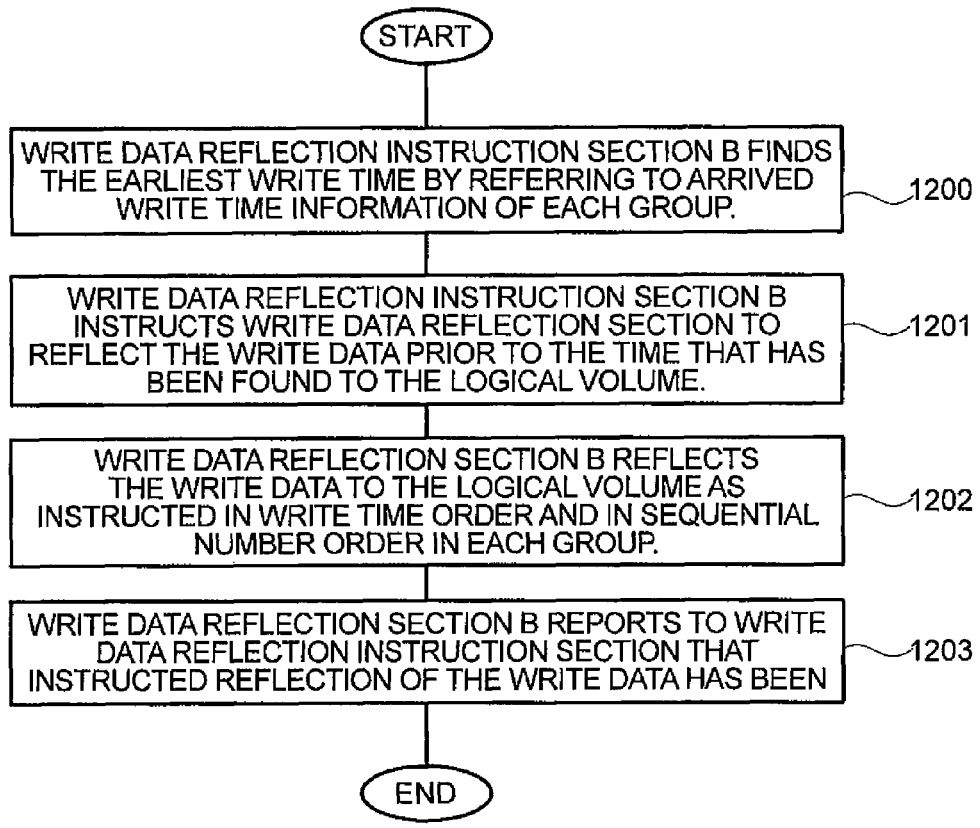
FIG. 9 is a flow diagram showing an example of reflection processing of write data in the storage device B.

FIG. 9 it is a view showing an example of the reflection processing of write data in the storage device B 190 (i.e. the processing of storage of the write data to the logical volume).

The write data reflection instruction section B 230 checks the arrived write time information 350 of all the logical volume groups of the storage device B 190 and finds, of these, the earliest time (step 1200). The write data reflection instruction section B 230 gives instructions (or permission) (step 1201) to the write data reflection section B 240 for reflection to these logical volumes of the write data whose write time is previous to the time that was thus found. When the write data reflection section 240 receives these instructions (or permission), by referring to the write data management information 330 and group management information 310, it reflects the write data in the designated time range (i.e. the write data whose write time is previous to the time found in step 1200), in the order of the write times, or, if these write times are the same, in the order of the sequential numbers in the various logical volume groups, in respect of the logical volume 500 in which the copy is stored (i.e. the write data is stored in the logical volume on the target side) (step 1202). After completion of reflection of all of the write data in the range specified in step 1202, the write data reflection section B 240 reports completion of the instructed processing (step 1203) to the write data reflection instruction section 230. The storage device B may discard the reflected write data from the cache 400.

By means of the above processing from step 1200 to step 1203, one of cycle of reflection processing is completed. The write data reflection instruction section B 230 and the write data reflection section B 240 repeat the above cycle in order to reflect the write data transferred from the storage device A continuously.

By means of the above processing, a copy of the updated data of the storage device B 190 is stored maintaining the order between updating of data by the mainframe host and updating of data by the open system host. Regarding data consistency between the copies, mutual consistency can be maintained between the data of the mainframe host and the data of the open system host.

Specifically, the storage device A 100 utilizes the write time 650 contained in the write request 630 received from the mainframe host and applies a write time also to the write data received from the open system host and, furthermore, manages the received write data using both the write times and the sequential numbers. The target storage device B 190 designates the write data that is capable of being reflected (i.e. that is capable of storage in a logical volume on the target side) using the sequential numbers and the write times and stores the designated write data in a logical volume on the target side. As a result, even if buffering and/or transferring are provided in parallel mid-way, write order is maintained between the data written from the mainframe host and the data written from the open system host, so copy data can be stored in a logical volume of the storage device B 190 on the target side.

Also, even if some fault occurs in for example the storage device A 100, so that previously updated write data does not reach the storage device B 190, since the sequential numbers will not be continuous in respect of the write data of write times subsequent to the write time of the write data that failed to arrive, reflection thereof will not be allowed. Gaps of updating of data cannot therefore occur in the target side storage device B 190 and consistency between the source storage device A 100 and target storage device B 190 is ensured. As a result, even if a fault occurs in the source storage device A 100, business can be continued using the content of the logical volume 500 of the storage device B 190, which is matched with the MFB 690 and/or open system host B 790.

Also, since, in the above processing, write times are applied to all of the write data received by the storage device A 100, irrespective of whether the host that employs the data is a mainframe host or open system host, it is possible to ascertain information such as up to which write time the write data in any desired logical volume 500 has been transferred from the storage device A 100 to the storage device B 190 or has arrived at the storage device B 190 or has been reflected at the storage device B 190 (i.e. has been stored in a logical volume).

It should be noted that, in order to lighten the processing load in the above step 1202, the write data in the designated time range may be stored in the logical volume 500 that stores the copy in sequential number order in the various logical volume groups, neglecting the write time order. In this case, consistency between the copies (i.e. between the logical volumes of the storage device B 190 on the target side) is maintained by the timing of the reports of completion of processing in step 1203. If it is desired to hold consistent data of the period between a report of completion of processing and the next report of completion of processing, a snapshot of the logical volume 500 in which the copy is stored may be acquired with the timing of the report of completion of processing. The technique disclosed in for example U.S. Pat. No. 6,658,434 may be employed as a method of acquiring such a snapshot. In this method, the storage content of a logical volume 500 (source volume) in which is stored the data whereof a snapshot is to be acquired is copied to another logical volume 500 (target volume) of the storage device B 190, so that the updated content is reflected also to the target volume when the source of volume is updated. However, in this embodiment, once the snapshot of the source volume has been stored in the target volume, the content of the target volume is frozen and verified by stopping reflection at that time.

Also in the transfer processing of the above write data, it was assumed that, initially, the write data transfer section A 220 transfers the write data in respect of the write data reception section B 211; however, it would be possible for the write data reception section B 211 to initially issue a write data transfer request in respect of the write data transfer section 220 and for the write data transfer section A 220 to transfer the write data in respect of the write data reception section B 211 after having received this request. By employing write data transfer requests, the pace of transfer of write data can be adjusted in accordance with for example the processing condition or load of the storage device B 190 or the amount of write data that has been accumulated.

Also, in the above processing, it was assumed that the location of storage of the write data was the cache 400; however, by preparing a separate logical volume 500 for write data storage, the write data could be stored in this logical volume 500. In general, a logical volume 500 of large volume may be prepared in respect of the cache 400, so this makes it possible for more write data to be accumulated.

Also, in the above processing, it was assumed that the write time information 340 was updated by the write time 650 of reception from the mainframe host; however, it may be arranged for the storage device A 100 to possess an internal clock and to constantly update the write time information 340 by reference to this clock. In this case, FIG. 10 shows an example of the processing that is executed when a write request in respect of a logical volume 500 (logical volume 500 constituting the source) where the storage device A 100 creates a copy is received from the MFA 600 or open system host A 700. This processing is processing corresponding to the processing shown in FIG. 3.

The write data reception section A 210 receives (step 1300) a write request from the MFA 600 or open system host A 700. The write data reception section A 210 stores (step 1301) the write data in the cache 400 and applies a write time to the write data by referring to the write time information 340 that is constantly updated in accordance with the clock provided in the storage device A 100, and creates (step 1302) write data management information 330 by applying a sequential number to the write data, by referring to the group management information 310. Finally, completion of writing is reported to the MFA 600 or open system host A 700 (step 1303).

Also, in the above processing, a time is used in the write time information 340 or the write time of the write data management information 300 or the arrived write time information 350; however, the time that is employed for this purpose need not necessarily be of the form of years, months, days, hours, minutes, seconds, milliseconds, microseconds, nanoseconds or a total of an ordinary time and instead a sequential number could be employed. In particular, FIG. 11 shows an example of the processing when the storage device A 100 has received a write request in respect of the logical volume 500 (logical volume 500 constituting the source), where the copy is created, from the MFA 600 or open system host A 700, in a case where the storage device A 100 itself updates the write time information 340. This processing is processing corresponding to FIG. 3 or FIG. 10. It should be noted that, in FIG. 11, the initial value of the write time information 340 may for example be 0 and numbers successively incremented by 1 may be applied to the write data as shown below as the write times.

The write data reception section A 210 receives a write request (step 1400) from the MFA 600 or open system host A 700. The write data reception section A 210 stores the write data in the cache 400 (step 1401), reads the number from the write time information 340 and applies to the write data (step 1402) as the write time the value obtained by incrementing this by 1. Then the write data reception section A 210 records the value after incrementing by 1 as the write time information 340, thereby updating the write time information 340 (step 1403). The write data reception section A 210 also creates the write data management information 330 (step 1405) by applying a sequential number to the write data (step 1404) by referring to the group management information 310. The write data reception section A 210 finally reports completion of writing (step 1406) to the MFA 600 or open system host A 700.

When a sequential number is employed as the write time in this manner, in the storage device B 190, instead of the write data reception section B 211 being arranged to update the arrived write time information 350 using the write time applied to the write data received and the write data reflection instruction section B 230 being arranged to designate the range of write data capable being stored in a logical volume of the storage device B by checking the arrived write time information 350 of the various logical volume groups, it may be arranged for the write data reflection section 240 to reflect (i.e. store) the write data arriving at the storage device B by referring to the sequential number recorded at the write time of the write data management information 330 in the logical volume 500 without skipping numbers in the number sequence.

Embodiment 2

Figure 12:
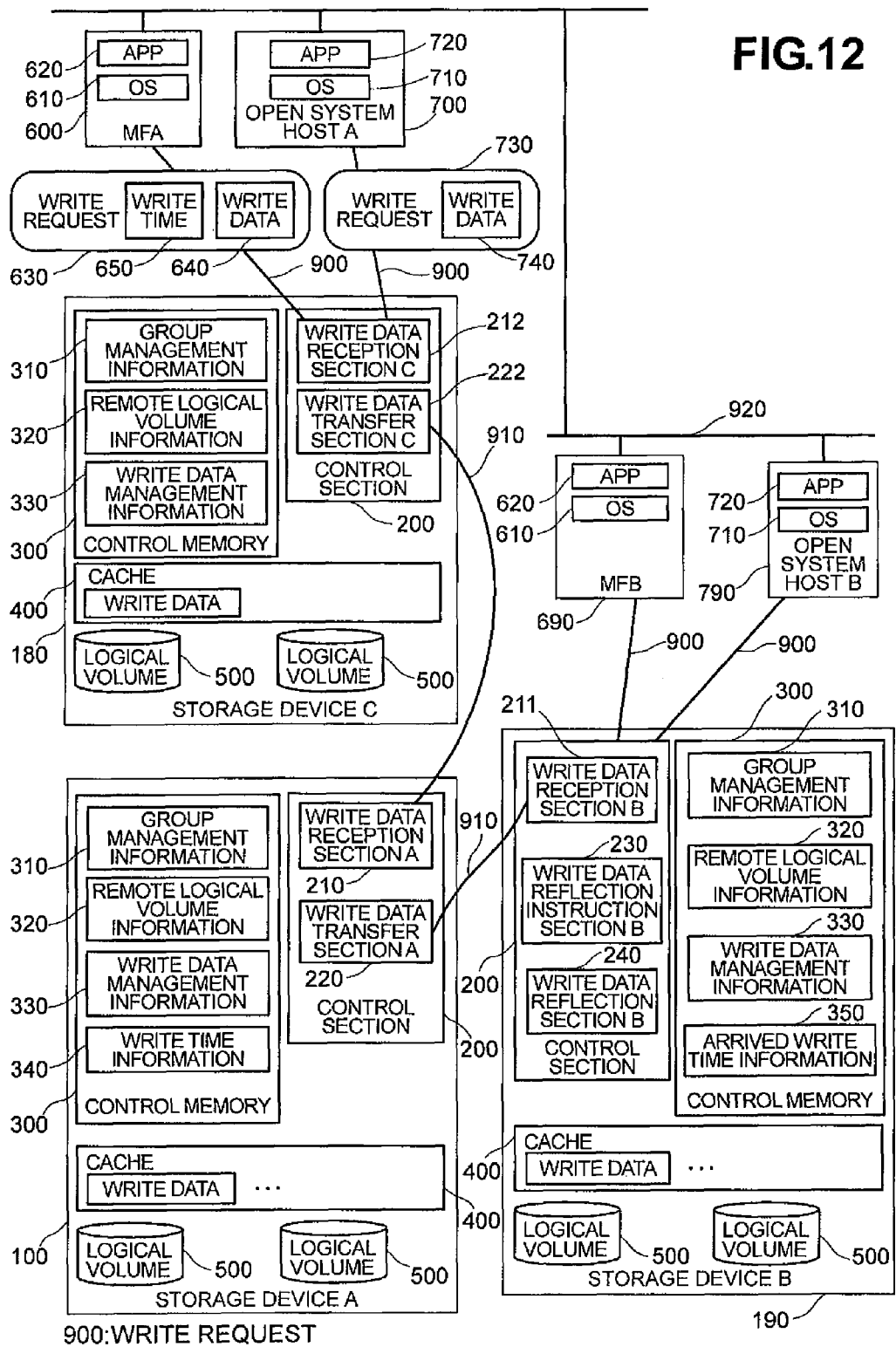
FIG. 12 is a view showing an example of the layout of a computer system according to embodiment 2.

FIG. 12 is a view showing an example of the layout of a computer system according to a second embodiment.

The differences with respect to embodiment 1 lie in that the MFA 600 and open system host A 700 are connected with the storage device C 180 through an I/O path 900 and the storage device C 180 is connected with the storage device A 100 through a transfer path 910. In this embodiment, a copy of the data stored in the logical volume 500 of the storage device C 180 is stored in a logical volume 500 of the storage device A 100. Further, a copy of the data stored in the logical volume 500 of the storage device A is stored in the logical volume 500 of the storage device B 190 in processing like the processing described in embodiment 1. That is, in this embodiment, a copy of the data stored in the logical volume 500 of the storage device C 180 is stored in the storage device A 100 and the storage device B 190.

In order to implement such processing, the storage device C 180 is provided with the various items of information and a construction like that of the storage device A 100 described in embodiment 1. However, the timing with which the write data reception section C 212 reports completion of writing in respect of the write data is different from that in embodiment 1. The write data reception section reports completion of writing to the MFA 600 or to the open system host A after reception of a report of completion of reception from the write data reception section A of the storage device A in the following way. Other details of the layout of the storage device C are the same as in the case of the storage device A described in embodiment 1.

When the storage device C 180 has received a write request 630 or a write request 730 for the logical volume 500 from the MFA 600 or open system host A 700, it stores the received write data 640 or write data 740 in a logical volume in the storage device C 180 and transfers this to the write data reception section A 210 of the storage device A 100. At this point, in contrast to the processing described in embodiment 1, the storage device C 180 sends notification of completion of writing to the MFA 600 or open system host A 700 after waiting for notification of completion of reception from the write data reception section A 210, and the storage device C 180 is thereby able to guarantee that a copy of the write data 640 or write data 740 that was written thereto is present in the storage device A 100. In this way, if for example due to the occurrence of some fault in the storage device C 180 or on the transmission path 910, transfer of data to the storage device A 100 has not succeeded, the MFA 600 or open system host A 700 will not deem write data that have not been transferred to the storage device A 100 to have been written but will only deem write data that have been received by the storage device A 100 to have actually been written; a copy as expected by the APP 620 on the MFA 600 or the APP 720 on the open system host A 700 will therefore exist on the storage device A 100. Furthermore, after all of the write data received by the storage device A 100 have been sent to the storage device B 190, a copy as expected will also exist on the storage device B 190, so, at the time where the processing executed by the MFA 600 or open system host A 700 was interrupted, the MFB 690 or open system host B 790 will be able to continue business using data as expected identical with the data that are recognized as having been written by the MFA 600 or open system host A 700.

As initially indicated in embodiment 1, when the write time information 340 is updated by the write time 650 applied to the write data, the write data reception section C 212 of the storage device C 100, if a write time 650 is included in the received write request 630, records the write time also in the write data management information 330 and the write data transfer section C 222 also transfers this write time to the write data reception section A210 of the storage device A 100 when performing write data transfer. After receiving the write data and the write time, the write data reception section A 210 processes the write data and the write time received from the storage device C 180 by the same method as the processing of the write request 630 that was received from the mainframe host in embodiment 1; consistency between the copies stored in the logical volumes in the storage device A 100 is thereby maintained and consistency between the write data issued from the mainframe host and the write data issued from the open system host can thereby be maintained.

In this way, even if, due for example to a large-scale disaster, faults occur in both of the storage device C 180 and the storage device A 100, business can be continued using the consistent content of the logical volume 500 of the storage device B 190, which was matched with the MFB 690 and open system host B 790. As indicated in the final part of embodiment 1, when the write time information 340 is updated from the storage device A 100 itself, transfer of the write time from the storage device C 180 is unnecessary, so that, after receiving the write data from the storage device C 180, the write data reception section A 210 may perform processing on the write data like the processing of FIG. 11 indicated in the latter part of embodiment 1.

It should be noted that there may be a plurality of storage devices C 180 that connect to the storage device A 100.

Also, although not shown, if the mainframe host and open system host are connected by an I/O path with the storage device A 100, the mainframe host or open system host that is connected with the storage device A may continue the business that was being conducted by the MFA 600 or open system host A 700 using the consistent content of a logical volume 500 of the storage device A 100 that was matched therewith, in the event that a fault occurs in the MFA 600 or open system host A 700 or storage device C 180.

Embodiment 3

Figure 13:
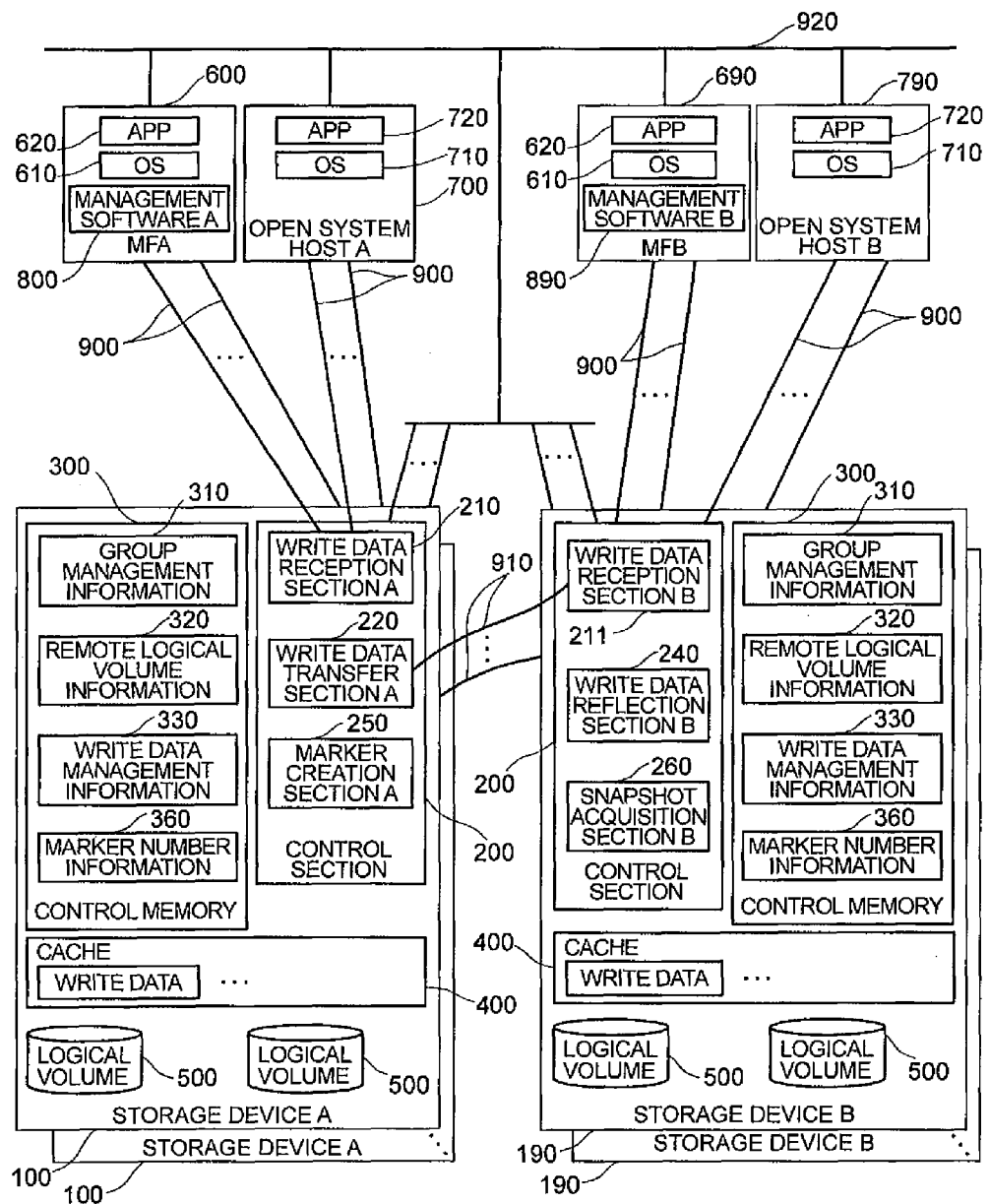
FIG. 13 is a view showing an example of the layout of a computer system according to embodiment 3.

FIG. 13 is a view showing an example of the construction of a computer system according to Embodiment 3.

The chief differences with respect to embodiment 1 lie in that there are a plurality of respective storage devices A 100 and storage devices B 190, the MFA 600 and open system host A 700 are connected through an I/O path 900 respectively with a plurality of storage devices A 100, the MFB 690 and the open system host B 790 are connected through an I/O path 900 respectively with a plurality of storage devices B 190, the MFA 600 includes management software A 800 and the MFB 690 includes management software B 890. Other differences will be described below.

Hereinbelow, the processing in respect of writing performed to the various logical volumes 500, transfer of write data to the storage device B 190 and the processing of reflection of write data in the storage device B 190 (i.e. storage of the write data in the logical volume) will be described in respect of the logical volumes 500 employed by the MFA 600 and the open system host A 700. This processing ensures that mutual consistency is maintained between the data of the mainframe host and the data of the open system host in regard to consistency between copies respectively stored in the plurality of logical volumes that are possessed by the plurality of storage devices B 190.

Figure 14:
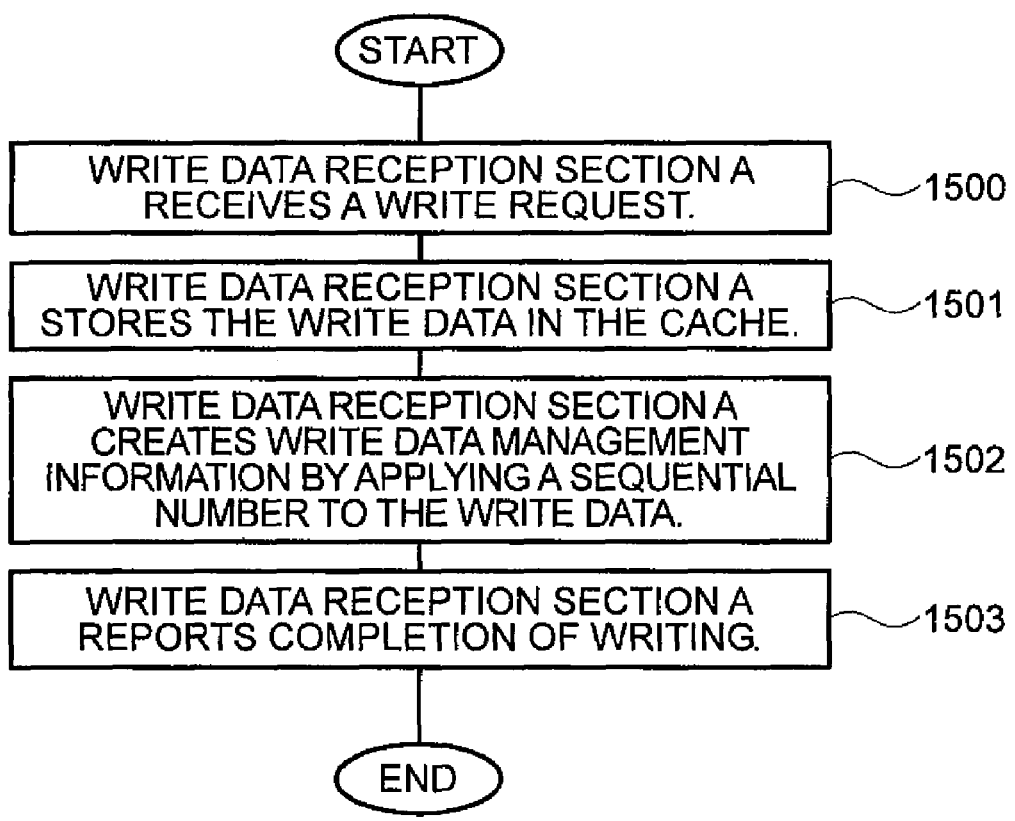
FIG. 14 is a flow diagram showing another example of processing in the case where the storage device A in embodiment 3 has received a write request.

FIG. 14 is a view showing an example of the processing when a write request in respect of the logical volume 500 (logical volume 500 constituting the source) in which a copy is created by the storage device A 100 is received from the MFA 600 or open system host A 700.

The write data reception section A 210 receives (step 1500) a write request from the MFA 600 or open system host A 700. The write data reception section A 210 stores the write data in the cache 400 (step 1501) or, as in embodiment 1, creates write data management information 330 (step 1502) by acquiring a sequential number by referring to the group management information 310. Finally, the write data reception section A 210 reports to the MFA 600 or open system host A 700 completion of writing (step 1503). The group management information 310 is the same as that in the case of embodiment 1. The write data management information 330 of this embodiment will be described later.

Figure 15:
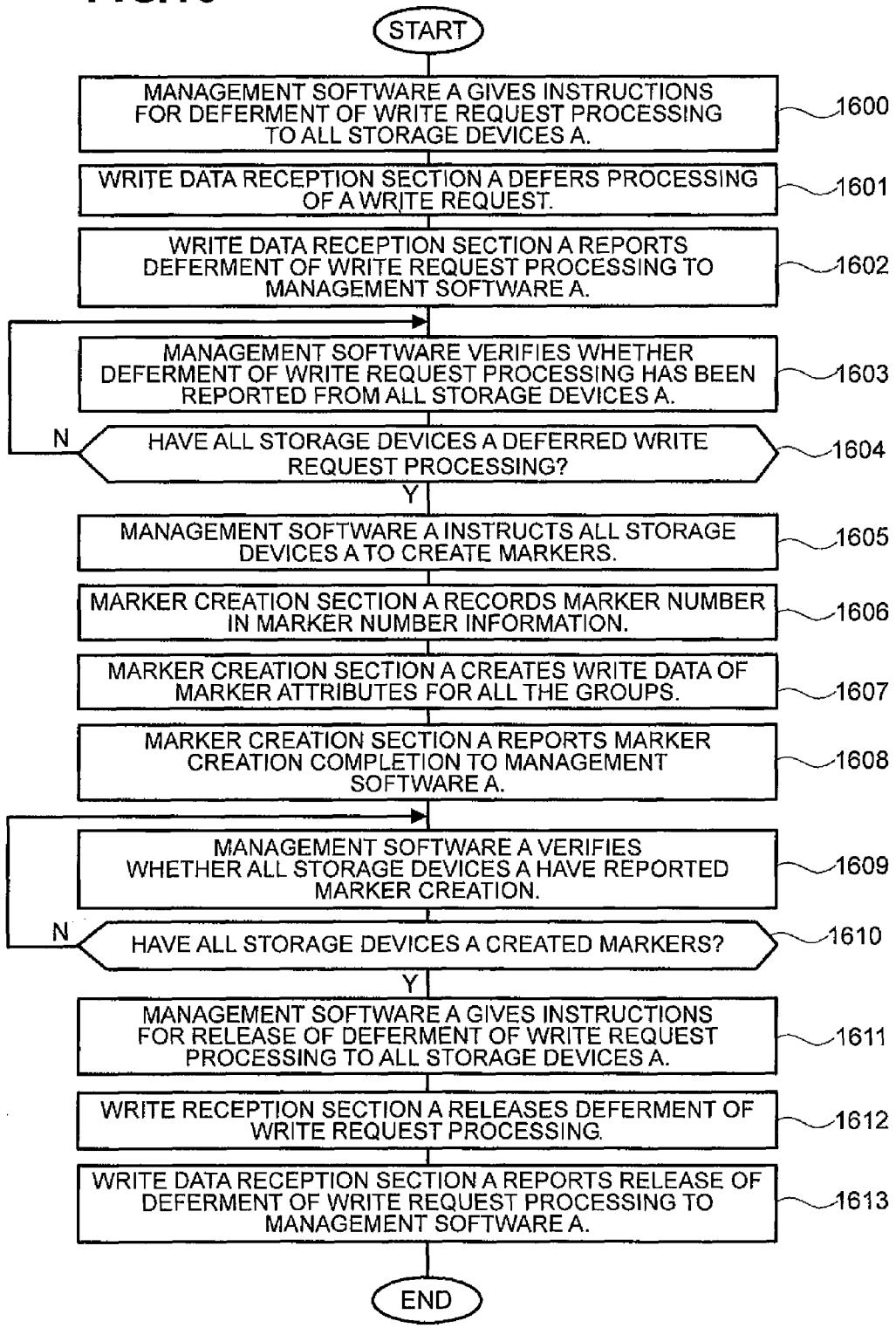
FIG. 15 is a flow diagram showing an example of processing in the case where the management software A gives instructions for deferring processing of a write request in respect of the storage device A and creation of a marker.

FIG. 15 is a view showing an example of the processing when the management software A 800 gives instructions for deferment of processing of write requests in respect of the storage device A 100 and creation of a marker. As will be described later, consistency is established between the copies stored in the plurality of storage devices B 190 by subsequently performing synchronization of reflection to the copies, with the timing with which this processing was performed during updating of the logical volume 500 of the storage device A 100.

First of all, the management software A 800 gives instructions for deferment of processing of write requests to all of the storage devices A 100 (step 1600). On receipt of these instructions, the write data reception section A 210 defers processing of write requests (step 1601) and reports to the management software A 800 the fact that deferment has been commenced (step 1602). After the management software A 800 has confirmed that commencement of deferment has been reported from all of the storage devices A 100 that have been so instructed, processing advances to the following processing (step 1603 and step 1604).

Figure 16:
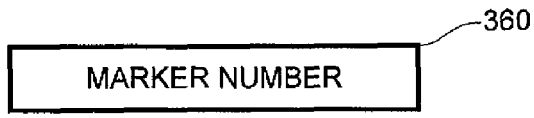
FIG. 16 is a view showing an example of marker number information.

Next, the management software 800 instructs all of the storage devices A 100 to create markers (step 1605). This instruction includes a marker number as a parameter. The marker number will be described subsequently. On receipt of this instruction, the marker creation section A 250 records the received marker number in the marker number information 360 shown in FIG. 16 stored in the control memory 300 (step 1606) and creates (step 1607) special write data (hereinbelow called a marker) for information transmission in respect of all of the logical volume groups. A marker is write data in which a marker attribute is set in the write data management information 300.

Figure 17:
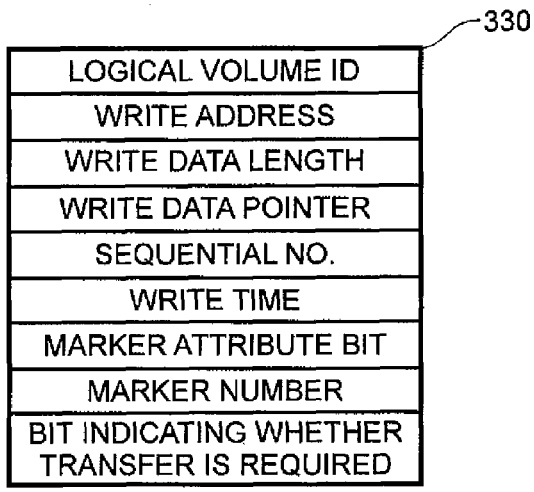
FIG. 17 is a view showing another example of write data management information.

FIG. 17 is a view showing an example of write data management information 330 of write data in this embodiment; a marker attribute bit and marker number are added to the write data management information 330 of embodiment 1.

The marker attribute bit is a bit indicating that the write data in question is a marker and is OFF in the case of ordinary write data but is set to ON in the case of a marker. A marker number as described above is set in the "marker number". The sequential number in the group is acquired and applied in respect of a marker in the same way as in the case of ordinary write data. Specifically, in marker creation, the marker creation section A 250 obtains a sequential number from the group management information 310 of the group in the same way as in the processing of the write data reception section A 210 and records a value obtained by adding 1 thereto in the write data management information 330 as the sequential number of the aforesaid marker, and records the new sequential number in the group management information 310. When the sequential number has been applied in this way to the marker, it is transferred to the storage device B 190 in the same way as in the case of ordinary write data, but the marker is not reflected to the logical volume 500.

The marker number is a number for identifying the instruction in response to which the marker was created; when a marker creation instruction is issued by the management software A 800, for example the initial value thereof is 0 and the marker number is incremented by 1 before being issued. The management software A 800 may confirm the current marker number by reading the marker number recorded in the marker number information 360.

Returning to FIG. 15, after the marker creation section A 250 has created a marker in respect of all of the logical volume groups, the marker creation section A 250 reports completion of marker creation to the management software A 800 (step 1608). After confirming that completion of marker creation has been reported from all of the designated storage devices A 100, the management software A 800 proceeds to the subsequent processing (step 1609, step 1610).

The management software A 800 gives instructions (step 1611) for cancellation of deferment of processing of write requests to all of the storage devices A 100. On receipt of these instructions, the write data reception section A 210 cancels deferment of processing of write requests (step 1612) and reports to the management software A 800 (step 1613) the fact that such deferment has been cancelled.

Figure 18:
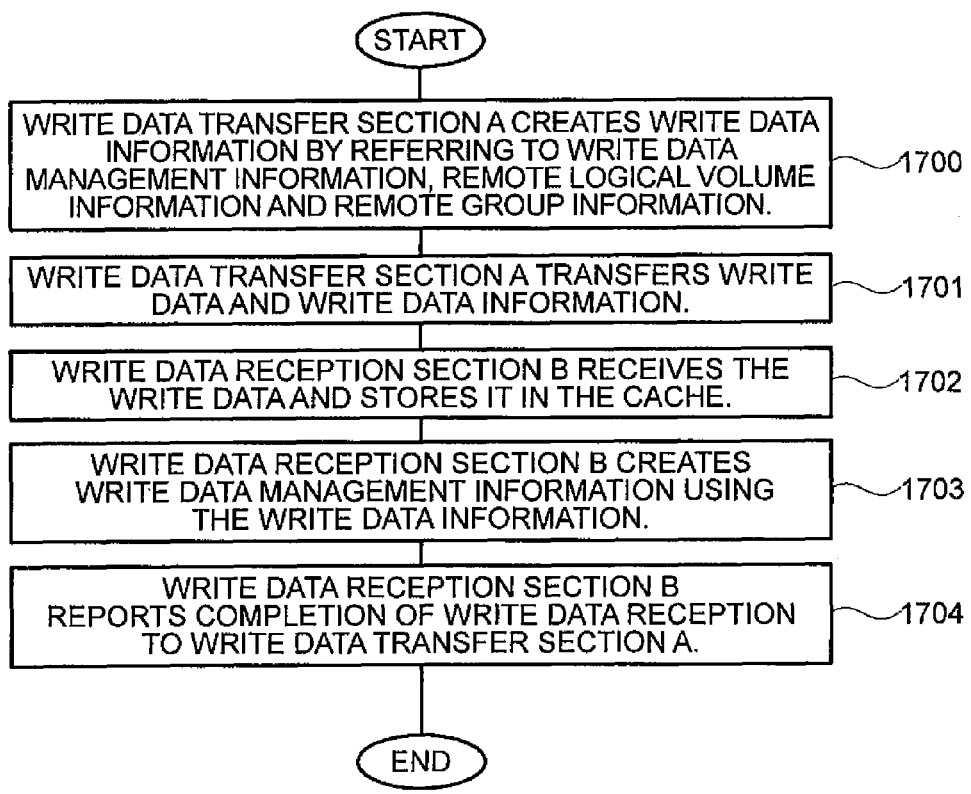
FIG. 18 is a flow diagram showing an example of transfer processing of write data from the storage device A in embodiment 3 to the storage device B.

FIG. 18 is a view showing an example of transfer processing of write data to a storage device B 190 from a storage device A 100. This processing is substantially the same as the transfer processing described in FIG. 6 of embodiment 1, but differs in that no updating of the arrived write time information 350 is performed by the write data reception section B 211. It should be noted that the write data management information 330 of the storage device B 190 is the same as the write data management information shown in FIG. 17, described above; in step 1703, the presence or absence of the marker attribute of the write data and/or the marker number recorded in the write data management information 330.

Figure 19:
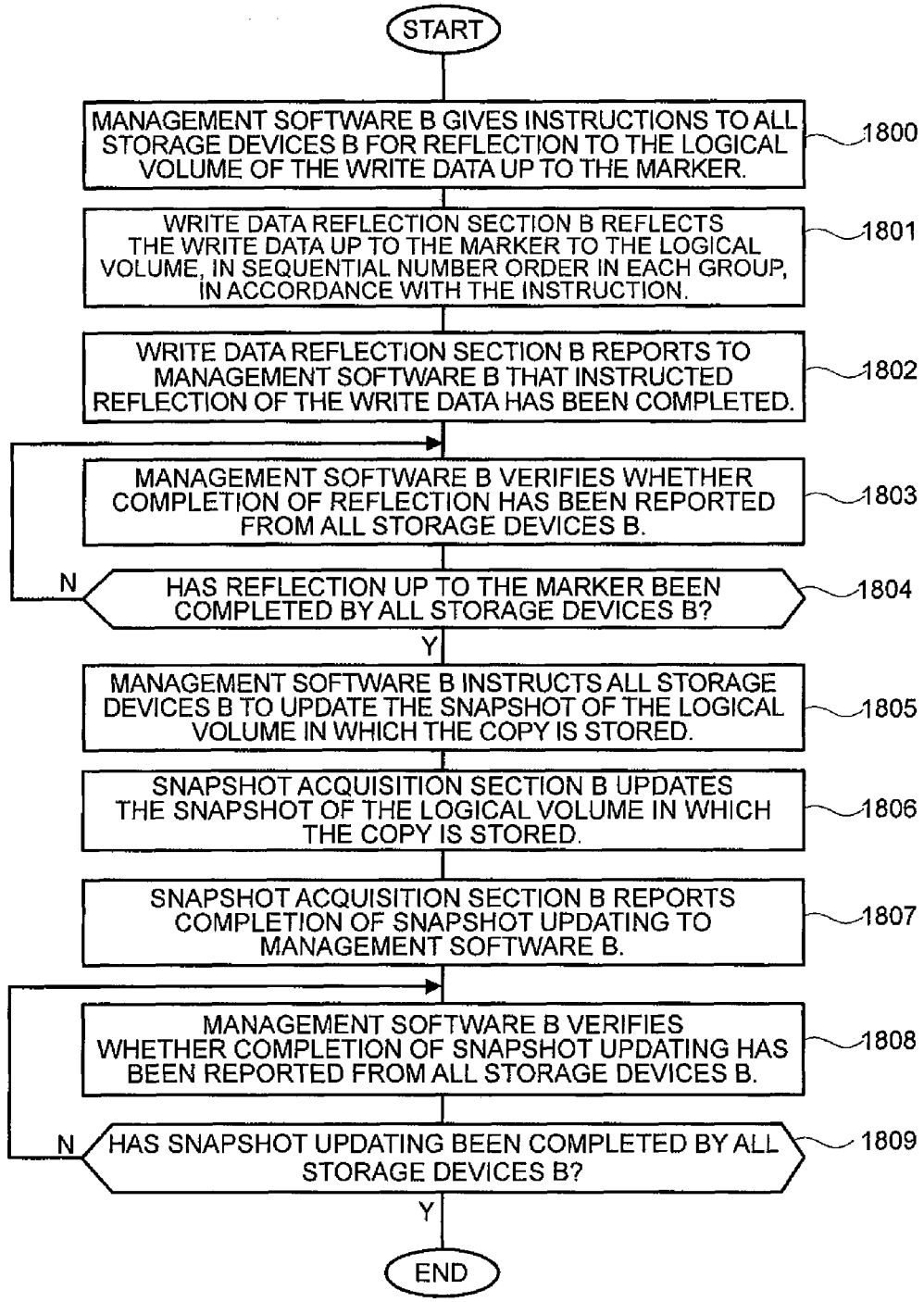
FIG. 19 is a flow diagram showing an example of reflection processing of write data in the storage device B in embodiment 3.

FIG. 19 is a view showing an example of the processing of reflection (storage) of write data to a logical volume in the storage device B 190. First of all, the management software B 890 gives instructions for reflection of the write data, as far as the marker, to the logical volume 500 in which a copy is stored (step 1800) to all of the storage devices B 190. After receiving such an instruction, the write data reflection section B 240 refers to the write data information 330 and group management information 310 and reflects (step 1801) the write data as far as the marker, in the sequential number order in each group, to the logical volume 500 in which the copy is stored. Specifically, the write data reflection section B 240 continues to store the write data in the logical volume in the order of the sequential numbers, but stops data storage processing on finding write data with the marker attribute (i.e. a marker) and then reports completion of reflection to the management software B 890 (step 1802). In the aforementioned processing, the write data reflection section B 240 checks the marker numbers of the markers that are recorded in the write data management information 330 and thereby ascertains whether the marker number is correct (whether the marker conforms to rules which are the same as the marker number decision rules, described above, for example of being a number whose initial value is 0 and that is incremented by 1 with respect to the previous marker number). If the marker number is not correct, the write data reflection section B 240 reports an abnormal situation to the management software B 890; if the marker number is correct, the write data reflection section B 240 records the marker number in the marker number information 360 and reports a normal situation. The management software B 890 may confirm the current marker number by reading the marker number that is recorded in the marker number information 360.

After confirming that a "normal reflection completed" report has been obtained from all of the storage devices B 190 that had been designated, the management software B 890 proceeds to the next processing (step 1803, step 1804).

Next, the management software B 890 gives instructions (step 1805) for updating of the snapshot of the logical volume 500 that stores the copy to all of the storage devices B 190. After receiving this instruction, the snapshot acquisition section B 260 updates (step 1806) the snapshot of the content of the logical volume 500. As the method of acquiring such a snapshot, for example the technique disclosed in U.S. Pat. No. 6,658,434 may be employed. It should be noted that, in this embodiment, just as in the case of the method described in embodiment 1, reflection of the write data to the volume that stores the snapshot data is stopped at the time of acquisition of the snapshot, and the content of the volume that stores the snapshot is frozen. After updating the snapshot, the snapshot acquisition section B 260 reports completion of snapshot updating to the management software B 890 (step 1807). After confirming that a report of completion of snapshot updating has been obtained from all of the storage devices B 190 that were designated, the management software B 890 proceeds to the next processing (step 1808, step 1809).

The management software A 800 and the management software B 890 respectively repeat the processing of the aforesaid step 1600 to step 1613 and of step 1800 to step 1809.

In this way, the updating of the storage device A 100 to the logical volume 500 is constantly reflected to the logical volume 500 of the storage device B 190.

By processing as described above, the data updating by the MFA 600 and the open system host A 700 is stopped and a marker is created with the timing (checkpoint) at which the updating condition is unified between the plurality of storage devices; reflection (i.e. storage) of the updated data to the stored copy data in the plurality of target logical volumes provided in the plurality of target storage devices B 190 can be synchronized at the time immediately preceding the writing of the marker, so mutual consistency between the various copies can be obtained with the data of the mainframe host and the data of the open system host at the time of this marker. In addition, the MFB 690 or open system host B 790 can continue business using the matched data stored in the snapshot volume, since a copy having mutual consistency is held in the snapshot volume, this snapshot being acquired by reflection of the updated data to the copy data at a time that is synchronized between the plurality of copy data.

Figure 20:
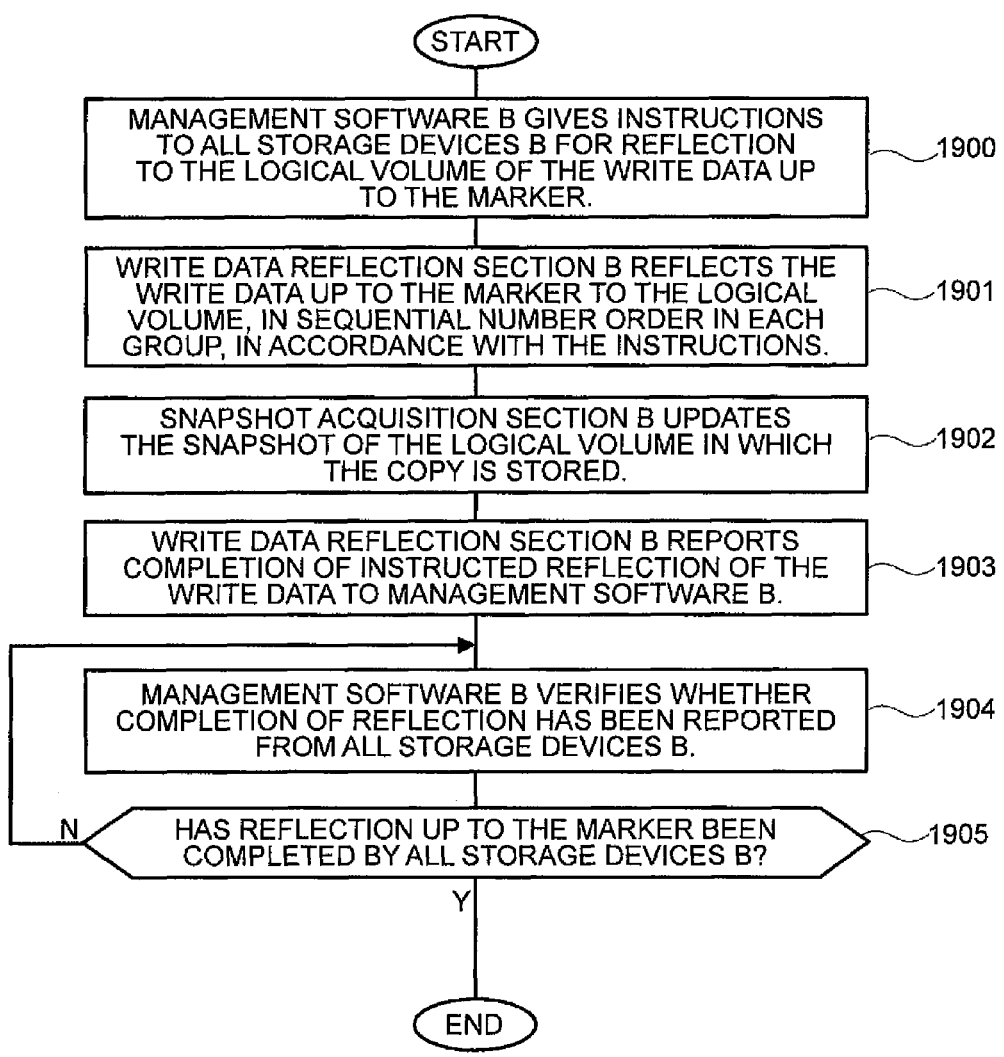
FIG. 20 is a flow diagram showing another example of reflection processing of write data in the storage device B in embodiment 3.

In the above processing, the snapshot was assumed to be updated by the storage device B 190 in response to an instruction from the management software B 890, but it would be possible to update the snapshot with the timing of synchronization of reflection of the updated data between the copy data of a plurality of storage devices B 190. FIG. 20 shows an example of the reflection processing of write data to the copy in the storage devices B 190 in this case.

The management software B 890 gives instructions (step 1900) for reflection of the write data as far as the marker to the logical volume of 500 that stores the copy in all of the storage devices B 190. After receiving such an instruction, the write data reflection section B 240 reflects the write data in the same way as in the processing described with reference to FIG. 19 but stops the reflection as soon as it finds a marker and notifies the snapshot acquisition section B 260 (step 1901). After receiving such notification, the snapshot acquisition section B 260 updates the snapshot of the content of the logical volume 500 and notifies the write data reflection section B 240 (step 1902). After receiving this notification, the write data reflection section B 240 reports completion of reflection to the management software B 890 (step 1903). The management software B 890 confirms that a report of completion of snapshot updating has been obtained from all of the storage devices B 190 that were designated and then proceeds to the next processing (step 1904, step 1905).

Also, in the aforesaid processing, it was assumed that the storage device A 100 or storage device B 190 reported completion of processing in respect of the various types of instructions from the management software A 800 or management software B 890. However, it would also be possible for completion of the various types of processes by the storage device A 100 or storage device B 190 to be detected by the management software A 800 or management software B 890 by the management software A 800 or management software B 890 periodically making inquiries of the storage device A 100 or storage device B 190 regarding their processing condition in respect of the aforesaid instructions.

Also, in the above processing, transfer processing of write data from the storage device A 100 to the storage device B 190 is performed continuously, but it would be possible for the storage device A 100 to create a marker and to then stop transfer of write data and, in addition, for the storage device B 190, after detecting reflection processing of the received marker (after reflection of the write data previous to the marker) to stop reflection of the write data i.e. to put the processing by the storage device A 100 and storage device B 190 in a stopped condition (also called a suspended condition). However, the storage device B 190 could perform write data reflection up to the detection of the marker without reference to instructions from the management software B 890. In this case, the marker creation instruction is equivalent to an instruction to shift to the suspended condition and mutually matched copies are created in the logical volume 500 of the storage device B 190 at the time where all of the storage devices B 190 have shifted to the suspended condition. When restarting the copy processing, the copy processing is recommenced by the storage device A 100 and storage device B 190 in response to an instruction for recommencement of copy processing from the management software A 800 or management software B 890 after acquisition of the snapshot of the logical volume 500. As a result, copies having mutual consistency can be held in data stored by the snapshots, so MFB 690 or open system host B 790 can continue business using the matched data.

Also, in the processing described above, the various types of instructions, reports and exchange of information between the management software A 800 or management software B 890 and storage device A 100 and storage device B 190 may be executed by way of an I/O path 900 or could be executed by way of a network 920. In the case where instructions for marker creation are given in the form of a write request to the storage device A 100, a logical volume 500 that is not subject to the processing deferment of write instructions is provided at the storage device A 100 and the marker creation instructions are given in respect of this logical volume 500.

In the above processing, the storage device A 100 and storage device B 190 need not be connected in one-to-one relationship and it is not necessary that there should be the same number of devices, so long as the respective logical volumes 500 and logical volume groups correspond as source and copy.

Also, in the above construction, it was assumed that the management software A 800 was present in the MFA 600 and the management software B 890 was present in the MFB 690; however, it would be possible for the management software A 800 and management software B 890 to be present in any of the MFA 600, MFB 690, open system host A 700, open system host B 790, storage device A 100 or storage device B 190. Also, they could be present in another computer, not shown, connected with the storage device A 100 or storage device B 190.

In the above processing, it was assumed that the write data reflection section B 240 determined the correct marker number, but it would also be possible for the correct marker number to be designated to the storage device B 190 as a parameter of the reflection instructions by the management software B. Also, it could be arranged that when the management software A 800 gives instructions for deferment of processing of write requests and marker creation to the storage device A 100, a unique marker number is determined and designated to the storage device A 100 and communicated to the management software A 890 and that this management software B 890 then designates this marker number to the storage device B 190.

In the above processing, the occasion at which the management software A 800 instructions for deferment of processing of write requests and marker creation to the storage device A 100 may be determined in a manner linked with the processing of the APP 620 or APP 720. For example, synchronization of reflection to the copy may be performed at the check point by giving instructions for deferment of write request processing and marker creation on the occasion of creation of a DBMS checkpoint. Business can therefore be continued by the MFB 690 or open system host B 790 using the data of this condition, by obtaining a snapshot in the condition in which the stored content of the source logical volume 500 at the checkpoint has been reflected to the copy in the target logical volume.

It could also be arranged for the MFA 600 or open system host A 700 to defer issue of a write request to the storage device A 100 or to restart, by linking the OS 610 or OS 710 with the management software A 800, instead of the management software A 800 giving instructions for deferment of processing of write requests and canceling of deferment in respect of the storage device A 100.

Also, as described in embodiment 1, a logical volume for write data storage that is separate from the cache 400 could be prepared and the write data stored in this logical volume 500 for write data storage. Also, in the transfer processing of write data, it would be possible for a write data transfer request to be initially issued in respect of the write data transfer section 220 by the write data reception section B 211 and for the write data to be transferred in respect of the write data reception section B 211 by the write data transfer section A 220 after receiving this request.

The processing described in this embodiment could also be implemented even if the write request does not contain a write time.

Embodiment 4

Figure 21:
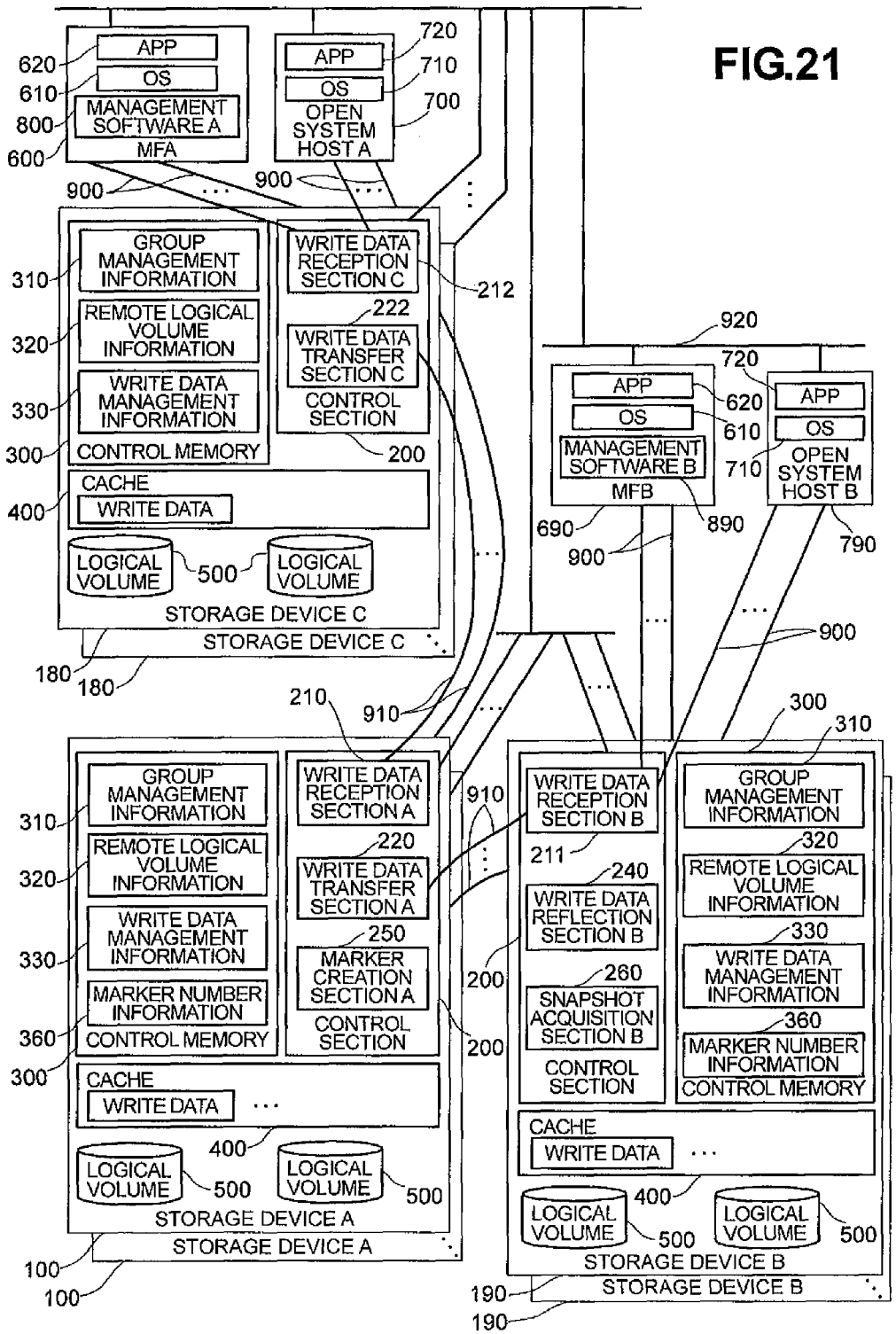
FIG. 21 is a view showing an example of the layout of a computer system according to embodiment 4.

FIG. 21 is a view showing an example of the layout of a computer system in embodiment 4.

The difference with respect to Embodiment 3 lies in that the MFA 600 and the open system host A 700 are respectively connected with a plurality of storage devices C 180 by way of an I/O path 900 and the plurality of storage devices C 180 are connected with a plurality of storage devices A 100 by way of a transfer path 910. In addition, the plurality of storage devices C 180 are connected with another computer or device by means of a network 920. The storage device A 100 and the storage device B 190 of embodiment 4 have the same construction and function as the storage device A 100 and storage device B 190 in embodiment 3.

In this embodiment, just as in the case of embodiment 2, a copy of the data stored in the logical volume 500 of the storage device C 180 is stored in the logical volume 500 of the storage device A 100. Specifically, the storage device C 180 comprises the same construction and various types of information as in embodiment 2 and after receiving a write request to the logical volume 500 from the MFA 600 or open system host A 700, the storage device C 180 stores the write data that it has received and transfers this received write data to the write data reception section A 210 of the storage device A 100; however, it is then guaranteed that a copy of the write data 640 or write data 740 that was written by the storage device C 180 exists in the storage device A 100, by sending a write completion notification to the MFA 600 or open system host A 700 after waiting for a notification of completion of reception from the write data reception section A 210, in the same way as in embodiment 2.

In addition, the storage device A stores a copy of the data stored in the logical volume 500 of the storage device C in a logical volume 500 of the storage device B 190 by the same processing as the processing described in embodiment 3. By processing as described above, as described in embodiment 2, even if for example some fault occurs in the storage device C 180 or in the transfer path 910, causing transfer of data to the storage device A 100 to become impossible, the expected content that was recognized as having been stored in the storage device C 180 when processing of the MFA 600 or open system host A 700 was interrupted can still be obtained from the storage device B190, so the MFB 690 or open system host B 790 can continue business using this data.

In the above processing, the management software A 800 gives instructions for deferment of processing of write requests or marker creation or cancellation of deferment of processing of write requests in respect of all of the storage devices C 180 in the same way as in the case of the processing performed in respect of the storage device A 100 in embodiment 3. Just as in the case of step 1600 of embodiment 3, the management software A 800 first of all gives instructions for deferment of processing of write requests to all of the storage devices C 180. After receiving these instructions, the write data reception section C 212 of the storage device C 180 defers processing of write requests in the same way as in the case of the processing performed by the storage device A 100 in step 1601 and step 1602 of embodiment 3 and reports commencement of deferment to the management software A 800. As described above, at this time, write data in respect of which a write completion notification has been given in respect of the MFA 600 or open system host A 700 has already been transferred to the storage device A 100 and the storage device A 100 creates write data management information 300 of this write data. In the same way as in the case of step 1603 and step 1604 of embodiment 3, the management software A 800 confirms that a report of commencement of deferment has been obtained from all of the designated storage devices C 180 before proceeding to the following processing.

Next, the management software A 800 gives instructions for marker creation to all of the storage devices C 180 in the same way as in the step 1605 of embodiment 3. After receiving such an instruction, the storage device C 180 transmits a marker creation instruction through the path 910 or network 920 to the storage device A 100 that stores the copy. After receiving the marker creation instruction, the storage device A 100 creates a marker in the same way as in step 1606, step 1607 and step 1608 of embodiment 3 and reports completion of marker creation to the storage device C 180 through the transfer path 910 or network 920. After receiving the report, the storage device C 180 reports completion of marker creation to the management software A 800. The management software A 800 confirms that a report of completion of marker creation has been received from all of the designated storage devices C 180 in the same way as in step 1609 and step 1610 of embodiment 3 before proceeding to the next processing.

Next, the management software A 800, in the same way as in step 1611 of embodiment 3, gives instructions for cancellation of deferment of processing of write requests to all of the storage devices C 180. After receiving these instructions, the write data reception section C 212 of the storage device C 180 cancels the write request processing deferment in the same way as the processing that was performed by the storage device A 100 in step 1612 and step 1613 of embodiment 3 and reports this cancellation of deferment to the management software A 800.

Specifically, deferment of processing of write requests and cancellation of deferment are performed by the storage device C 180 and marker creation meanwhile is performed by the storage device A 100 on transmission to the storage device A 100 of an instruction by the storage device C 180. As described above, write data in respect of which completion of writing has been notified to the MFA 600 or open system host A 700 has already been transferred to the storage device A 100 and write data management information 300 of such write data is created in the storage device A100, so deferment of processing of write requests by the storage device A 100 in embodiment 3 and deferment of processing of write requests by the storage device C 180 in this embodiment are equivalent. Consequently, by performing processing as described above and by performing other processing as described in embodiment 3, in the construction of this embodiment, reflection of updating to the copies can be synchronized at the marker time by stopping data updating by the MFA 600 and open system host A 700 in the same way as in embodiment 3 and creating a marker of the updated condition with unified timing (checkpoint) between the plurality of storage devices; mutual consistency of the respective copies with the mainframe host data and the open system host data can thus be achieved at this time. Furthermore, mutually matched copies are maintained in snapshot volumes by acquiring snapshots at the time of synchronization of reflection and the MFB 690 or open system host B 790 can therefore continue business using matched data.

In the above processing, it was assumed that the management software A 800 gave instructions for marker creation to the storage devices C 180 and the storage devices C 180 transmitted these instructions to the storage devices A 100; however, it would also be possible for the management software A 800 to give instructions for marker creation directly to all of the storage devices A 100 and for the storage devices A 100 to report completion of marker creation to the management software 800. Specifically, the management software A 800 first of all gives instructions for deferment of write request processing to all of the storage devices C 180 and the management software A 800 confirms that reports of commencement of deferment have been received from all of the designated storage devices C 180 before giving instructions for marker creation to all of the storage devices A 180 in the same way as in step 1605 of embodiment 3. After having received these instructions, the storage device A 100 creates a marker in the same way as in step 1606, step 1607 and step 1608 of embodiment 3 and reports completion of marker creation to the management software 800. After confirming that reports of completion of marker creation have been obtained from all of the designated storage devices A 100 in the same way as in step 1609 and step 1610 of embodiment 3, the management software A 800 may be arranged to give instructions for the cancellation of deferment of write request processing to all of the storage devices C 180.

Also, it would be possible that the storage devices C 180 are provided with a marker creation section and marker number information 330 and create a marker on receipt of instructions for marker creation from the management software A800; the marker, which has been created as write data, is then transferred to the storage device A 100 and completion of marker creation may be arranged to be reported to the management software A 800 when a report of receipt thereof has been received from the write data reception section 210 of the storage device A 100. In this case, the storage device A 100 treats the received marker as a special type of write data, which is transferred to the storage device B 190 after processing in the same way as ordinary write data except that reflection to the copy is not performed.

In any case, the above can be implemented irrespective of the number of storage devices C 180 that are connected with the storage devices A 100 and deposit copies on the storage devices A 100.

Also, although not shown, if a mainframe host and open system host are connected with the storage devices A 100 by an I/O path, if for example some fault occurs in the MFA 600 or open system host A 700 or storage devices C 180, the aforesaid mainframe host and open system host can continue business using the content of the logical volume 500 of the storage device A 100 that is matched therewith.

Embodiment 5

Figure 22:
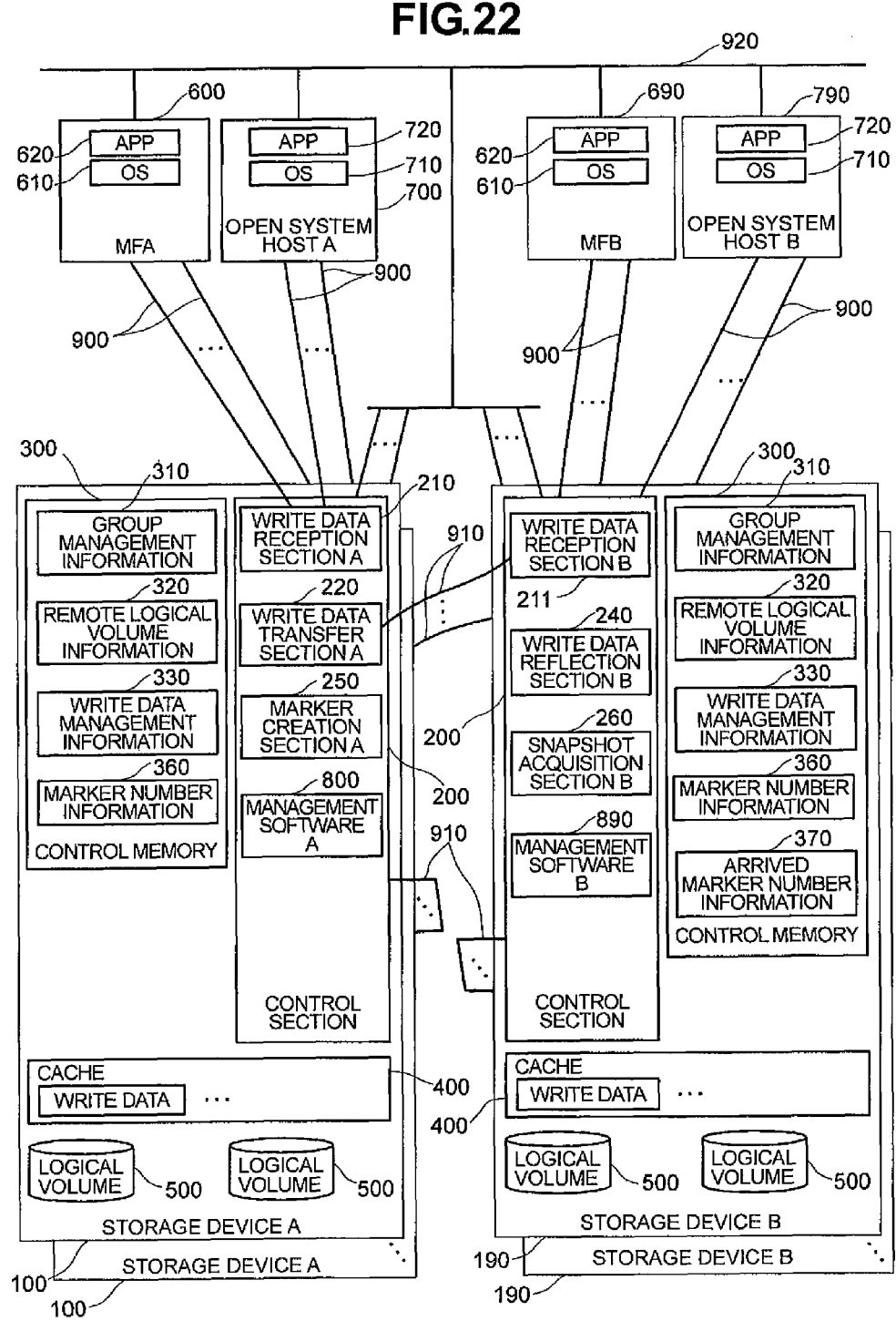
FIG. 22 is a view showing an example of the layout of a computer system according to embodiment 5.

FIG. 22 is a view showing an example of the layout in embodiment 5 of a computer system to which the present invention has been applied.

The differences from embodiment 3 are that the management software A 800 is stored on a single storage device A 100, the management software B 890 is stored on a single storage device B 190, the storage devices A 100 are connected by means of a transfer bus 910 and the storage devices B 190 are also connected by the transfer bus 910. Also, each storage device B 190 is provided with arrived marker number information 370, to be described, in a control memory 300. The arrived marker number information 370 is stored for each group. Other differences will be described below.

The processing in respect of writing to each logical volume 500, transfer to the storage device B 190 and reflection processing in the storage device B 190 will now be described in respect of the logical volume 500 that is employed by the MFA 600 and open system host A 700. Regarded consistency between the various copies, these processes ensure that consistency can always be maintained between the data of the mainframe host and the data of an open system host. In this embodiment, processing to ensure consistency between the various copies can be implemented by processing involving only processing of the storage device A 100 and storage device B 190, by controlling the storage device A 100 and storage device B 190 using the transfer bus 910 described above.

In this embodiment, the processing when the storage device A 100 receives a write request from the MFA 600 or open system host A 700 in respect of the logical volume 500 (source logical volume 500) whereof a copy is to be created is the same as the processing described in embodiment 3 and the storage device A 100 performs processing as described in FIG. 14 of embodiment 3. The various items of management information in this embodiment are the same as described in embodiment 3 with the exception of the arrived marker number information 370.

Figure 23:
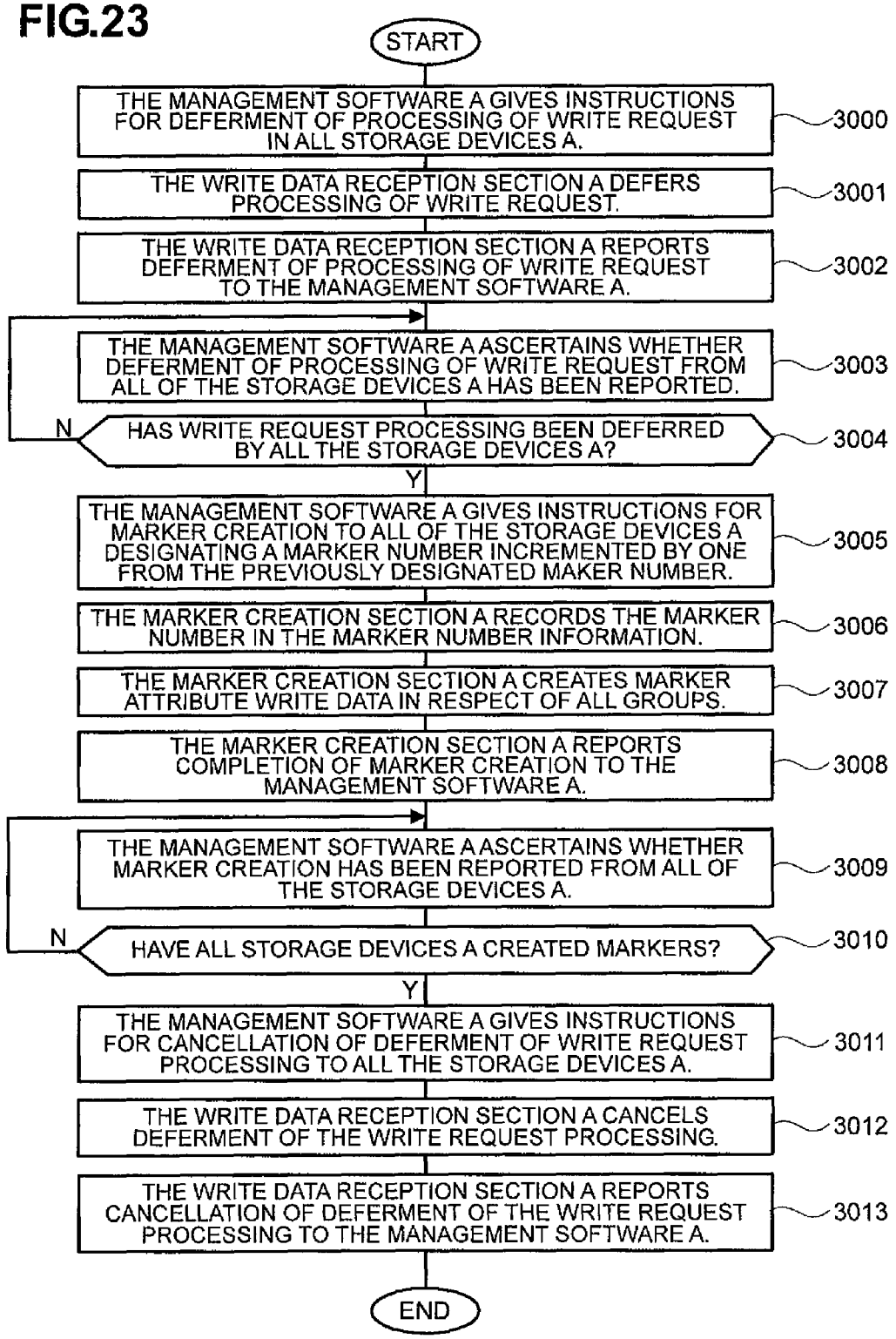
FIG. 23 is a flow diagram showing an example of deferment of processing of a write request in respect of a storage device A by the management software A in embodiment 5 and processing when instructions are given for marker creation.

FIG. 23 is a view showing the processing when the management software A 800 that is stored in the storage device A 100 gives instructions for deferment of processing of the write requests in respect of the storage devices A 100 and marker creation. This is practically the same as the processing described in FIG. 15 of embodiment 3. However, unlike the embodiment 3, in this embodiment, as described above, the management software A 800 is stored in a particular storage device A 100 of the plurality of storage devices A 100, so negotiation between the management software A 800 and the storage device A 100 takes place between the management software A 800 and a write data reception section or marker creation section within the storage device A 100 where the management software A 800 is stored or takes place between the management software A 800 and the write data reception section or marker creation section in a storage device A 100 other than the storage device A 100 where the management software A 800 is stored. Furthermore, in this embodiment, the rule that is used for determining the marker number is that the marker number designated in step 3005 is incremented by one with respect to the marker number on the previous occasion (i.e. the marker numbers are incremented by one in each case).

Figure 24:
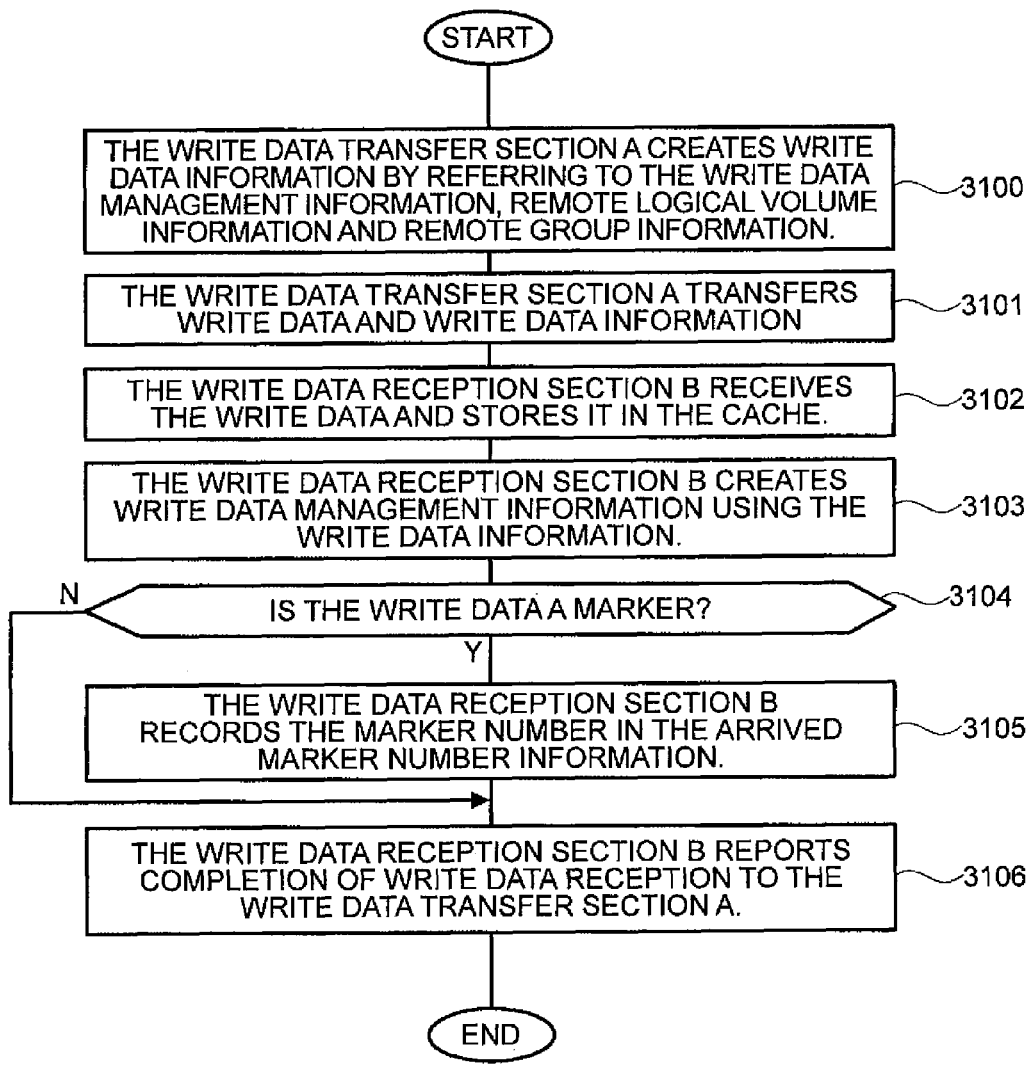
FIG. 24 is a flow diagram showing an example of transfer processing of write data from a storage device A in embodiment 5 to a storage device B.
Figure 25:
FIG. 25 is a view showing an example of arrived marker number information.

FIG. 24 is a view showing the transfer processing of the write data from the storage device A 100 to the storage device B 190. The processing is substantially the same as the processing described in FIG. 18 of embodiment 3, but differs in that, prior to reporting completion of write data reception in the write data transfer section A 220 in step 3106, in step 3104 the write data reception section B 211 ascertains whether the write data received by the write data reception section B 211 is a marker; if the write data is a marker, in step 3105, the write data reception section B 211 records the marker number of this marker in the arrived marker number information 370 shown in FIG. 25. The arrived marker number information 370 is created for each group and the management software B 890 can thus acquire the arrived marker number of each group by reading the marker number that is recorded in the arrived marker number information 370 of each group.

Figure 26:
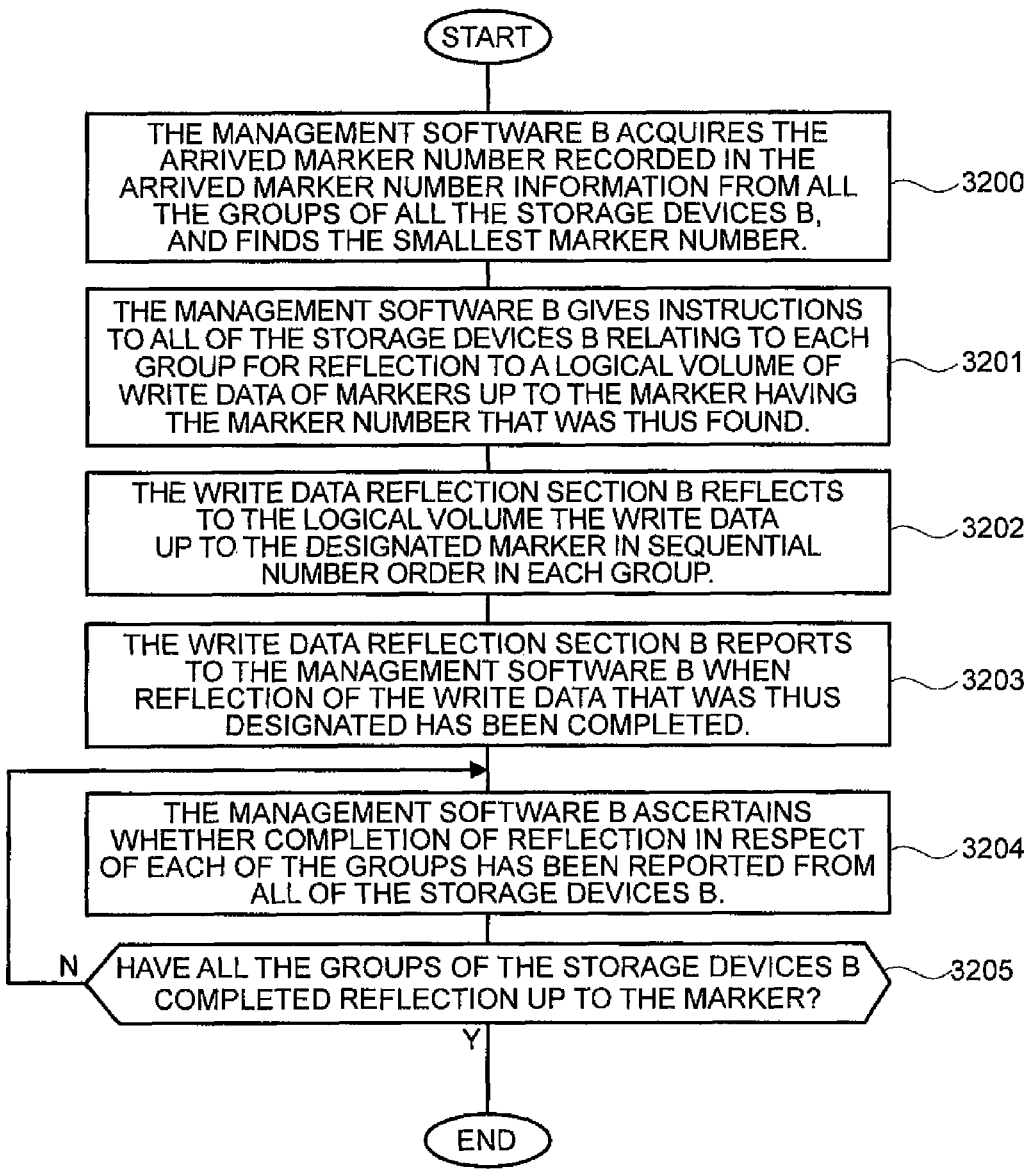
FIG. 26 is a flow diagram showing an example of reflection processing of write data to a copy in a storage device B in embodiment 5.

FIG. 26 is a view showing the reflection processing of the write data to a copy in the storage device B 190. The management software B 890 that is stored in the storage device B 190 acquires the marker numbers that are stored in the arrived marker number information 370 from all the groups of all of the storage devices B 190 and finds the smallest marker number of the marker numbers that have thus been acquired (step 3200). Next, the management software B 890 gives instructions to all of the storage devices B 190 relating to each group for reflection (step 3201) to the logical volume 500 of write data having all of the marker numbers up to the marker number that has thus been found. The write data reflection section B 240 that has received this instruction, by referring to the write data information 330 and group management information 310, reflects the write data to the logical volume 500 in which the copy is stored, in sequential number order in each group, up to the designated marker (step 3202). When, during processing of the write data in respect of each group in sequential number order, the write data reflection section B 240 finds the marker designated for each group, it stops the reflection and reports completion of reflection to the management software B 890 (step 3203). Since the smallest marker number was found in step 3200, the marker of this marker number must have arrived at each group of the storage devices B 190, so reflection of write data up to the designated marker must be possible. The write data reflection section B 240 records the marker number of the reflected marker in the marker number information 360 and the management software B 890 can thereby read and confirm the marker numbers recorded in the marker number information 360. After confirming that normal completion of reflection has been reported from all of the designated storage devices B 190 in respect of each group, the management software B 890 advances to the next processing (step 3204, step 3205).

The management software A 800 and management software B 890 respectively repeat the processing described above. In this way, updating to the logical volumes 500 of the storage devices A 100 is constantly reflected to the logical volumes 500 of the storage devices B 190.

In the reflection processing described above, consistency between the various copies is ensured and maintained without using snapshots, so a storage region for snapshots i.e. a logical volume 500 (auxiliary volume) for snapshots is unnecessary. On the other hand, even in a construction in which management software A 800 and management software B 890 as described above are created in the storage device A 100 and storage device B 190, processing such as the reflection processing described in embodiment 3 to ensure consistency using snapshots is still possible.

Regarding consistency between the copies created by the plurality of storage devices A 100 and plurality of storage devices B 190, consistency between the data of a mainframe host and the data of an open system host can always be maintained by means of the above processing. Furthermore, since processing for ensuring consistency between the copies is controlled by the storage devices A 100 and storage devices B 190, ensuring consistency between the copies can be achieved by processing involving only the storage devices A 100 and storage devices B 190, without needing to use the host resources.

In the processing described above, it was assumed that the various instructions, reports and information acquisition performed between the management software A 800 or management software B 890 and the storage devices A 100 or storage devices B 190 were effected via the transfer bus 910 but it would be possible to perform these via a network 920. If an instruction for the creation of a marker is given in the form of a write request to a storage device A 100, a logical volume 500 that is not being used for deferment of write request processing is provided in the storage device A 100 and this marker creation instruction is carried out in respect of this logical volume 500.

Also, in the above processing, it is not necessary for the storage devices A 100 and storage devices B 190 to be connected in one-to-one fashion, so it is not necessary to provide the same number of devices so long as the respective logical volumes 500 and groups correspond as source and copy.

Also, as described in embodiment 1, a logical volume 500 for write data storage may be provided separately from the cache 400 and the write data stored in this logical volume 500; also, in transfer processing of the write data, the write data reception section B 211 may initially issue a transfer request of write data in respect of the write data transfer section A 220 and the write data transfer section A 220 that has received this request may then transfer write data in respect of the write data reception section B 211.

Also, as in the fourth embodiment, another storage device D, not shown, corresponding to the storage device C 180 may be connected through the transfer bus 910 with the storage device A 100, and the MFA 600 and open system host A 70 may be connected through an I/O bus 900 with this other storage device D. In this case, in the same way as the processing described in embodiment 2 or embodiment 4, a copy of the logical volume 500 of the storage device D is stored in a logical volume 500 of the storage device A 100 and, in addition, as already described in this embodiment, a copy of the logical volume 500 of the storage device A 100 is stored in the logical volume 500 of the storage device B 190. Thereby, as described in embodiment 4 or embodiment 2, even if for example a fault is generated in the storage device D or the transfer bus 910, making it impossible to transfer data to the storage device A 100, the MFB 690 or open system host B 790 can continue business using the content as anticipated immediately after interruption of processing by the MFA 600 or open system host A 700.

In relation to the above processing, a storage device A 100 may provide the following interfaces (CLI or GUI or API):

(1) An interface for starting or stopping the above processing that is performed by the management software A 800

(2) An interface for acquiring or displaying the processing condition of the management software A 800

(3) An interface for determining or designating a storage device A 100 at which running of the management software A 800 is to be conducted. The storage device A 100 may be designated by a user or administrator or a storage device A 100 with low processing load may be automatically selected, taking into account the processing load balance. Also, an interface may be provided indicating storage devices A 100 that are capable of running the management software A 800, the user or administrator may then use this interface to obtain a conspectus of the storage devices A 100 that are capable of running the management software A 800, and may then select and designate the aforesaid storage device A 100 at which the management software A 800 is to be run from among these.

(4) An interface for designating storage devices A 100 and groups that are the subjects of the aforesaid processing performed by the management software A 800. Serial numbers or identifiers of the storage devices A 100, and group numbers or identifiers thereof etc may be designated as parameters. Also, an interface may be provided indicating storage devices A 100 and groups that are capable of being the subject of the aforesaid processing performed by the management software A 800, the user or administrator may then use this interface to obtain a conspectus of the storage devices A 100 and groups that are capable of being the subject of the aforesaid processing, and may then select and designate storage devices A 100 and groups to be the subject of the aforesaid processing from among these.

(5) An interface to delete storage devices A 100 or groups from the subjects of the aforesaid processing performed by the management software A 800. Serial numbers or identifiers of the storage devices A 100, and group numbers or identifiers thereof etc may be designated as parameters. Also, an interface may be provided indicating storage devices A 100 and groups that are currently the subject of the aforesaid processing performed by the management software A 800, the user or administrator may then use this interface to obtain a conspectus of the storage devices A 100 and groups that are capable of being deleted from the subjects of the aforesaid processing, and may then select and designate storage devices A 100 and groups to be deleted from the subjects of the aforesaid processing from among these.

(6) An interface to determine or designate the repetition interval of the aforesaid processing of the management software A 800. This interval may be specified by the user or administrator or may be automatically determined taking into account processing load or may be automatically determined in accordance with the amount of write data.

(7) An interface to determine or designate the upper limiting time to wait for a report from the storage devices A 100 in the above processing performed by the management software A 800.

(8) An interface for specifying or displaying causes of malfunction in the aforesaid processing performed by the management software A 800.

(9) An interface whereby, in the event that a malfunction occurs in the aforesaid processing that is performed by the management software A 800, the range of effect of this malfunction may be selected as deemed to be the entirety of the subjects of the aforesaid processing performed by the management software A 800, or certain storage devices A 100 related to the malfunction, or certain groups, or certain logical volumes 500.

(10) An interface for acquiring or displaying created marker numbers.

Also, in relation to the above processing, a storage device B 190 may provide the following user interfaces:

(11) An interface for starting or stopping the above processing that is performed by the management software B 890

(12) An interface for acquiring or displaying the processing condition of the management software B 890

(13) An interface for determining or designating a storage device B 190 at which running of the management software B 890 is to be conducted. The storage device B 190 may be designated by a user or administrator or a storage device B 190 with low processing load may be automatically selected, taking into account the processing load balance. Also, an interface may be provided indicating storage devices B 190 that are capable of running the management software B 890, the user or administrator may then use this interface to obtain a conspectus of the storage devices B 190 that are capable of running the management software B 890, and may then select and designate the aforesaid storage device B 190 at which the management software B 890 is to be run from among these.

(14) An interface for designating storage devices B 190 and groups that are the subjects of the aforesaid processing performed by the management software B 890. Serial numbers or identifiers of the storage devices B 190, and group numbers or identifiers thereof etc may be designated as parameters. Also, an interface may be provided indicating storage devices B 190 and groups that are capable of being the subject of the aforesaid processing performed by the management software B 890, the user or administrator may then use this interface to obtain a conspectus of the storage devices B 190 and groups that are capable of being the subject of the aforesaid processing, and may then select and designate storage devices B 190 and groups to be the subject of the aforesaid processing from among these.

(15) An interface to delete storage devices B 190 or groups from the subjects of the aforesaid processing performed by the management software B 890. Serial numbers or identifiers of the storage devices B 190, and group numbers or identifiers thereof etc may be designated as parameters. Also, an interface may be provided indicating storage devices B 190 and groups that are currently the subject of the aforesaid processing performed by the management software B 890, the user or administrator may then use this interface to obtain a conspectus of the storage devices B 190 and groups that are capable of being deleted from the subjects of the aforesaid processing, and may then select and designate storage devices B 190 and groups to be deleted from the subjects of the aforesaid processing from among these.

(16) An interface to determine or designate the repetition interval of the aforesaid processing of the management software B 890. This interval may be specified by the user or administrator or may be automatically determined taking into account processing load or may be automatically determined in accordance with the amount of write data that has arrived at the storage device B 190 but has not been reflected, or the difference between the reflected marker number and arrived marker number.

(17) An interface to determine or designate the upper limiting time to wait for a report from the storage devices B 190 in the above processing performed by the management software B 890.

(18) An interface for specifying causes of malfunction in the aforesaid processing performed by the management software B 890.

(19) An interface whereby, in the event that a malfunction occurs in the aforesaid processing that is performed by the management software B 890, the range of effect of this malfunction may be selected as deemed to be the entirety of the subjects of the aforesaid processing performed by the management software B 890, or certain storage devices B 190 related to the malfunction, or certain groups, or certain logical volumes 500.

(20) An interface for acquiring or displaying and arrived marker number and reflected marker number. Serial numbers or identifiers of the storage devices B 190, and group numbers or identifiers thereof etc may be designated as parameters.

(21) An interface for acquiring or displaying the amount of write data that has arrived but has not been reflected. Serial numbers or identifiers of the storage devices B 190, and group numbers or identifiers thereof etc may be designated as parameters.

(22) An interface for designating the size of the storage region in which write data that has arrived but has not been reflected is stored. Serial numbers or identifiers of the storage devices B 190, and group numbers or identifiers thereof etc may be designated as parameters.

The form of the above interfaces may be CLI, GUI or API. Also, regarding the method of use of the above interfaces, the terminal of a storage device A 100 or storage device B 190 may be directly employed, or the MFA 600 or MFB 690 or open system host A 700 or open system host B 790 or another computer, not shown, may be remotely employed via the network 920 or I/O bus 910 or transfer bus 920.

In the above description, it was assumed that the management software A 800 was stored in the storage device A 100 and the management software B 890 was stored in the storage device B 190. However, it would be possible for the management software A 800 to be run on the storage device B 190 or for the management software B 890 to be run on the storage device A 100, by executing various instructions, reports or information acquisition, using the transfer bus 910 or network 920. In this case also, since processing for ensuring consistency between the copies is controlled by the storage devices A 100 and storage devices B 190, ensuring consistency between the copies can be achieved by processing involving only the storage devices A 100 and storage devices B 190, without needing to use the host resources.

Embodiment 6

Figure 27:
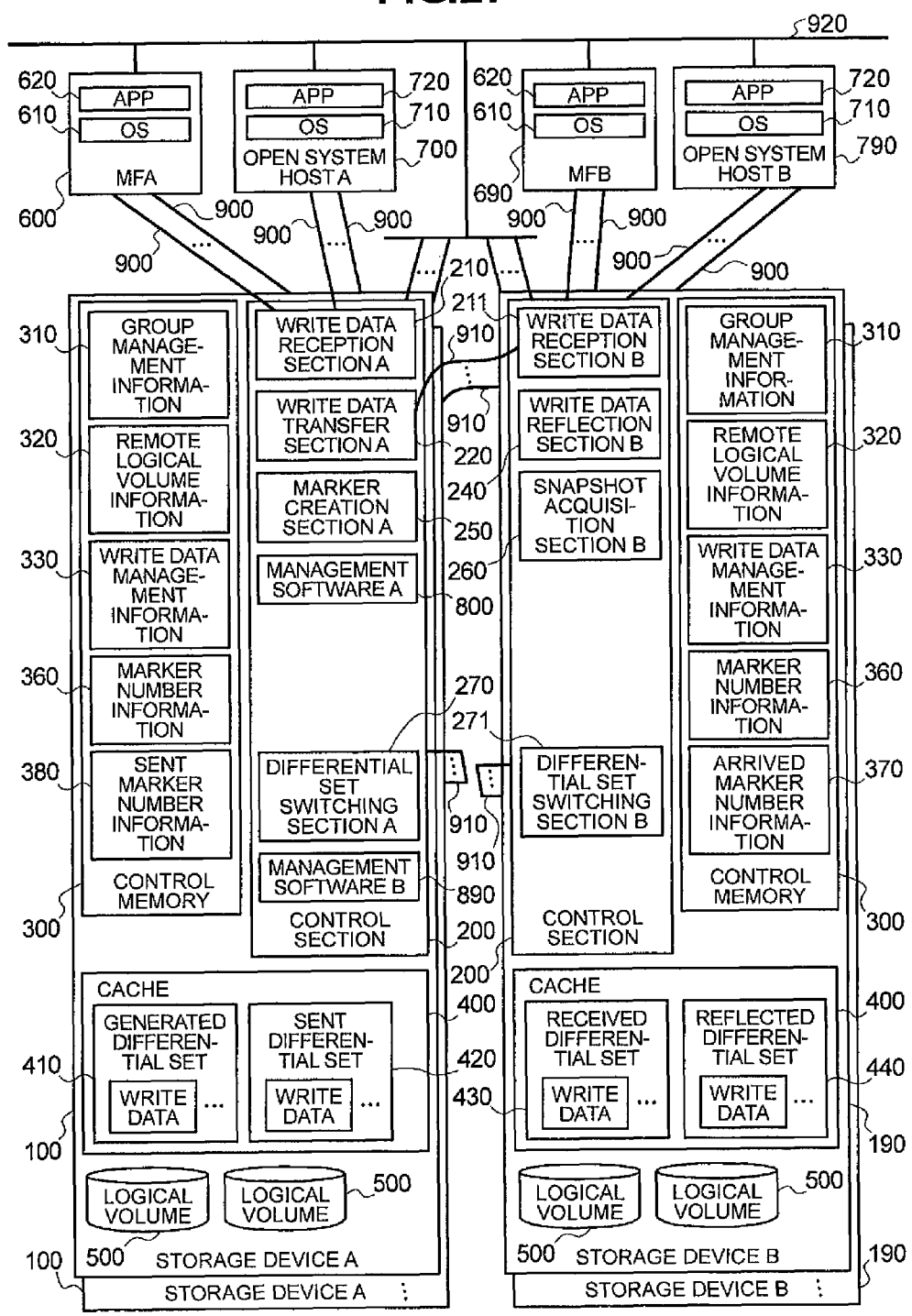
FIG. 27 shows a configuration example of the computer system in Embodiment 6.

FIG. 27 shows a configuration example in Embodiment 6 of the computer system employing the present invention. The system configuration of Embodiment 6 has many common features with that of Embodiment 5. Therefore, only the difference with Embodiment 5 will be described below. The main difference between Embodiment 6 and Embodiment 5 is described below.

(1) The management software A800 and management software B890 are present in one storage device A100.

(2) Write data that arrived to the storage device A 100 from the time a marker was created (T1) to the time the next marker was created (T2) is assembled in a group as a differential set, and the transfer of data from the storage device A100 to the storage device B190 or the reflection of data in the storage device B190 is executed in the differential set units. The marker number is used as identification information for identifying the differential set.

(3) For the above-described differential set management and for operating the differential set state, each storage device A100 has a differential set switching section A270 in the control unit 200, and each storage device B190 has a differential set switching section B271 in the control unit 200. Further, each storage device A has a sent marker number information 380 in the control memory 300.

Other differences will be sequentially described below.

First, processing using differential sets will be outlined.

(A) The storage device A100 manages the write data of the write request relating to a logical volume of the storage device A100 that was received on or after a certain time T1 as a generated differential set 410.

(B) When time T2 comes, the storage device A100 changes the generated differential set 410 into a sent differential set 420. Then, the storage device A100 manages the write data of the write request relating to the logical volume received on or after time T2 as a new generated differential set 410. Further, the storage device A100 sends the write data managed as the sent differential set 420 to the storage device B190, and the storage device B190 that received the data manages the received write data as a received differential set 430.

(C) If the storage device B190 receives all the data of the sent differential set 420, it changes the received differential set 230 into a reflected differential set 440. The storage device B190 then realizes the asynchronous remote copying by writing the write data present in the reflected differential set 440 into the logical volume of the storage device B190.

Further, the aforementioned changes in the state of differential sets and sending of write data are conducted based on the designation from a management software A 800 or management software B890. Processing from (A) to (C) may be executed in parallel as a pipeline processing.

Processing in response to a write request issued with respect to the logical volume 500 of the storage device A100 used by the MFA 600 or open system host A700, transfer processing of write data from the storage device A100 to the storage device B190, and processing of write data reflection in the storage device B190 will be explained below.

Figure 32:
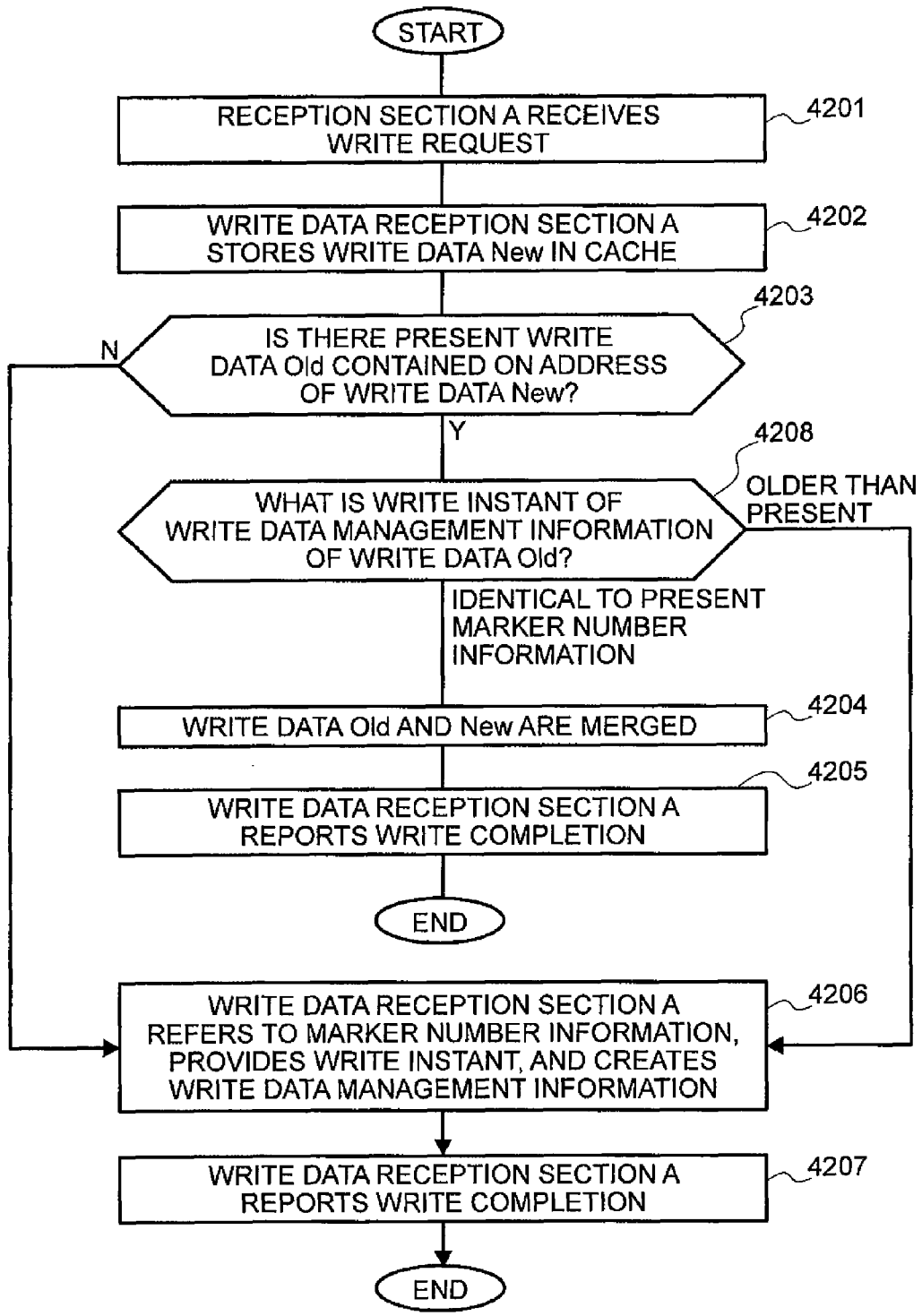
FIG. 32 shows an example of processing during write request reception in Embodiment 6.

FIG. 32 is a flowchart illustrating an example of processing conducted in the case where the write data reception section A210 receives a write request from the MFA 600 or open system host A700. Each step of the processing is explained below.

When the write data reception section A210 of the storage device A100 receives a write request (step 4201), the write data reception section A210 stores the write data (in the explanation hereinbelow, this write data will be referred to as "write data New") in a cache 400 (step 4202).

Then, the write data reception section A210 determines whether or not the write data received prior to step 4201 (referred to hereinbelow as "write data Old") is present in the storage area indicated by the start address and end address (can be computed from the start address and write length) of the write destination of the write data New obtained form the write command. The determination can be conducted, for example, by searching the write data management information 330 (step 4203). The write data management information 330 in the present embodiment will be described below.

When the write data Old are determined not to be present, the processing flow advances to step 4206, and when the write data Old is determined to be present, the processing flow advances to step 4208.

In step 4206, the write data reception section A210 refers to the marker number information 360 and creates the write data management information 330 by using the marker number recorded as the marker number information 360 as the write time. Here, in the present embodiment, the marker number is taken to be incremented by 1 based on the designation of the management software A800, similarly to Embodiment 5, and to be recorded as the marker number information 360 in the control memory 300 of each storage device A100. Furthermore, in the present embodiment, the information identical to the write data management information shown in FIG. 17 is used as the write data management information 330. However, in the present embodiment, the write data management information 330 may contain no sequential number, marker attribution bit, marker number, and transfer necessity bit. Furthermore, in the present embodiment, the marker number recorded in the marker number information 360 is used as the write time of the write data management information 330, as described hereinabove.

Returning to FIG. 32, in step 4207, the write data reception section A210 reports the write completion to the MFA 600 or open system host A700 that issued the write request and completes the processing.

On the other hand, in step 4208, the write data reception section A210 refers to the write data management information 330 of the write data Old that was confirmed to be present in step 4203 and compares the marker number recorded as the write time in the write data management information 330 of the write data Old with the marker number recorded as the present marker number information 360. If the comparison results show that those marker numbers are identical, the processing flow advances to step 4204, and if they are different (in other words, the write data Old is the data that is one generation older than the write data New), the processing flow advances to step 4206.

In step 4204, the write data reception section A210 merges the write data New and write data Old. Merging means bringing together a plurality of write data with overlapping addresses and write data management information 330. Then, in step 4205, the write data reception section A210 reports the write completion to the MFA 600 or open system host A700 that is the issuance source of the write request.

An example of merging operation of the write data New and write data Old explained in step 4204 shown in FIG. 32 will be described below with reference to FIG. 29.

Figure 29:
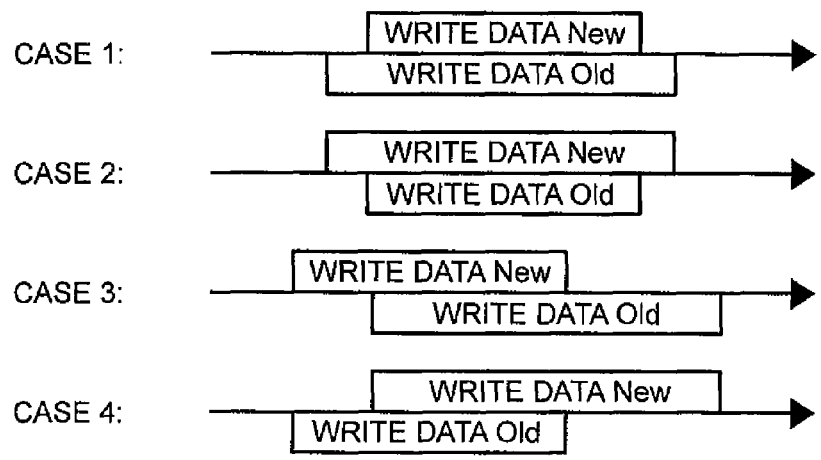
FIG. 29 shows an example of merge processing of the write data New and write data Old.

In case 1 shown in FIG. 29, the write data reception section A210 overwrites the write data New on the portion of the write data Old that is equivalent to the write data New on the cache 400. Then, the write data reception section A210 can directly use the write data management information 330 of the write data Old as the write data management information 330 of the write data New.

In case 2 shown in FIG. 29, the write data reception section A210 discards the write data Old. Further, the write data reception section A210 updates a write data pointer to a pointer to the write data New, of the write data management information 330 of the write data Old, also updates the write address and write data length respectively to the write address and write data length of the write data New, and takes the write data management information 330 after the update as the write data management information 330 of the write data New.

In cases 3 and 4 shown in FIG. 29, the write data reception section A210 overwrites the write data New on the write data Old on the cache 400. Further, the write data reception section A210 uses the smaller value of the write addresses of the write data Old and write data New as the write address of the write data management information 330 of the write data New. Moreover, the write data reception section A210 finds the largest end address of the end addresses of the write data Old and write data New and uses the value obtained by deducting the initially found write address from the end address as the write data length of the write data management information 330 of the write data New.

Because the write data reception section A 210 thus conducts merging of the write data and write data management information 330 in step 4204 shown in FIG. 32, only the newest write data remains inside the same differential set. In other words, when there are a plurality of write requests to overlapping addresses between the above-described time T1 and time T2, only the write data based on the newest write request remains on the cache 400 and is managed as the generated differential set in the control unit 200 of the memory device A100 with respect to the range with the overlapping addresses. Therefore, the quantity of data transferred from the storage device A100 to the storage device B190 can be reduced.

Figure 28:
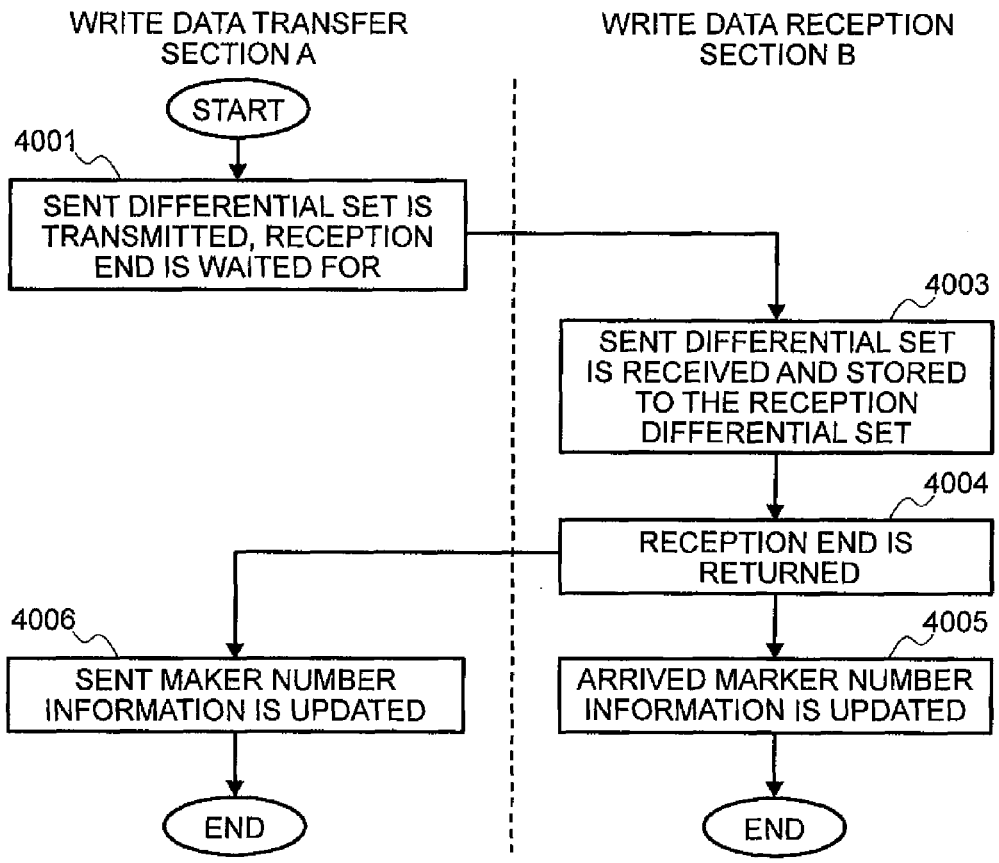
FIG. 28 shown an example of processing of the write data transfer section A and write data reception section B.

FIG. 28 is a flow chart illustrating an example of processing of the write data transfer section A and write data reception section B in the case of transferring write data from the storage device A100 to the storage device B190. The explanation below follows this flow.

The write data transfer section A220 sends the write data that is managed as the sent differential set 420 to the storage device B1190 (step 4001). At this time, the write data transfer section A220 also sends the write data management information 330 of the write data together with the write data that is managed as the sent differential set 420 to the storage device B190.

The write data transfer section A220 has the opportunity to start the send processing of this step 4001 when there is a designation from the management software A as will be described below in the explanation of step 4116 shown in FIG. 31. When the write data transfer section A220 completes sending the write data that is managed as the sent differential set 420, the write data transfer section sends a completion notification to this effect to the storage device B190 and waits for a reception completion report from the write data reception section B211.

In the present embodiment, a decision as to whether or not the write data present in the cache 400 is the write data contained in the sent differential set 420 can be made by referring to the marker number information 360 and write data management information 330. Thus, if the write data management information 330 is retrieved that holds as the write time the value that is one generation before the marker number indicated by the marker number information 360 (in the present embodiment, a value that is less by 1), then the write data corresponding to this write data management information 330 becomes the write data contained in the sent differential set 420.

If the write data reception section B211 receives the data of the sent differential set 420, the received write data is stored in the cache 400 as the received differential set 430 (step 4003). Further, the received write data management information 330 is stored in the control memory 300.

If the write data reception section B211 receives the completion notification from the write data transfer section A220, the write data reception section B211 recognizes that the reception of all the data of the sent differential set 420 has been completed and sends a reception completion report to the write data transfer section A220 (step 4004).

Then, the write data reception section B211 updates the arrived marker number information 370 located in the control memory 300 (step 4005). Thus, the write data reception section B211 records the marker number recorded as the write time in the write data management information 330 of the write data managed as the received differential set 430 as the arrived marker number information 370 in the control memory 300. In the present embodiment, this update processing is a processing of incrementing the value of the arrived marker number information 370 by 1.

On the other hand, the write data transfer section A220 that received the reception completion report from the write data reception section B211 updates the sent marker number information 380 (step 4006). Thus, the write data transfer section A220 records the marker number recorded as the write time in the write data management information 330 of the write data sent to the write data reception section B211 in step 4001 as the sent marker number information 380 in the control memory 300. In the present embodiment, this update processing is a processing of incrementing the value of the sent marker number information 380 by 1.

Figure 30:
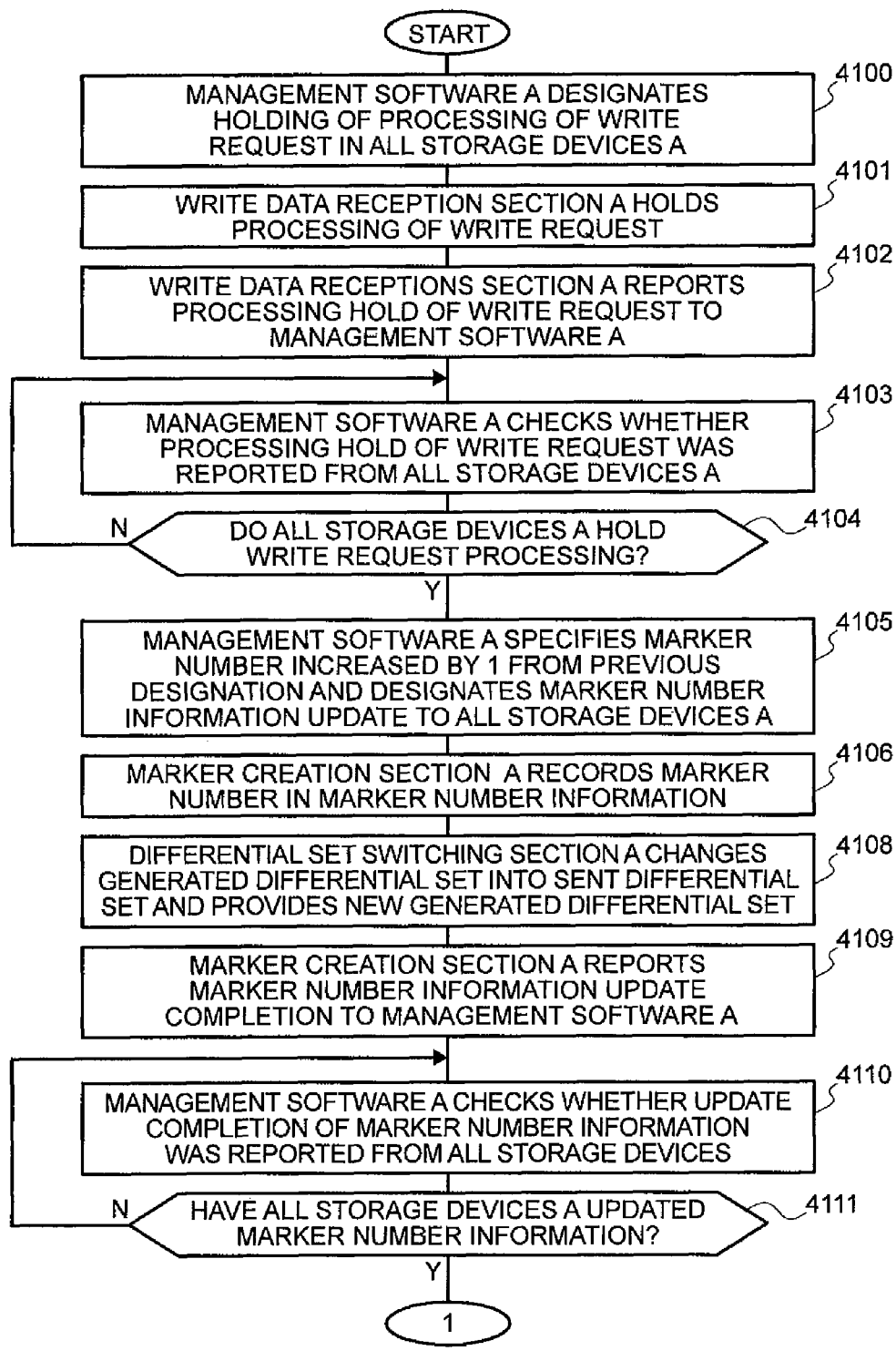
FIG. 30 shows an example of write request holding and switching processing of differential sets.
Figure 31:
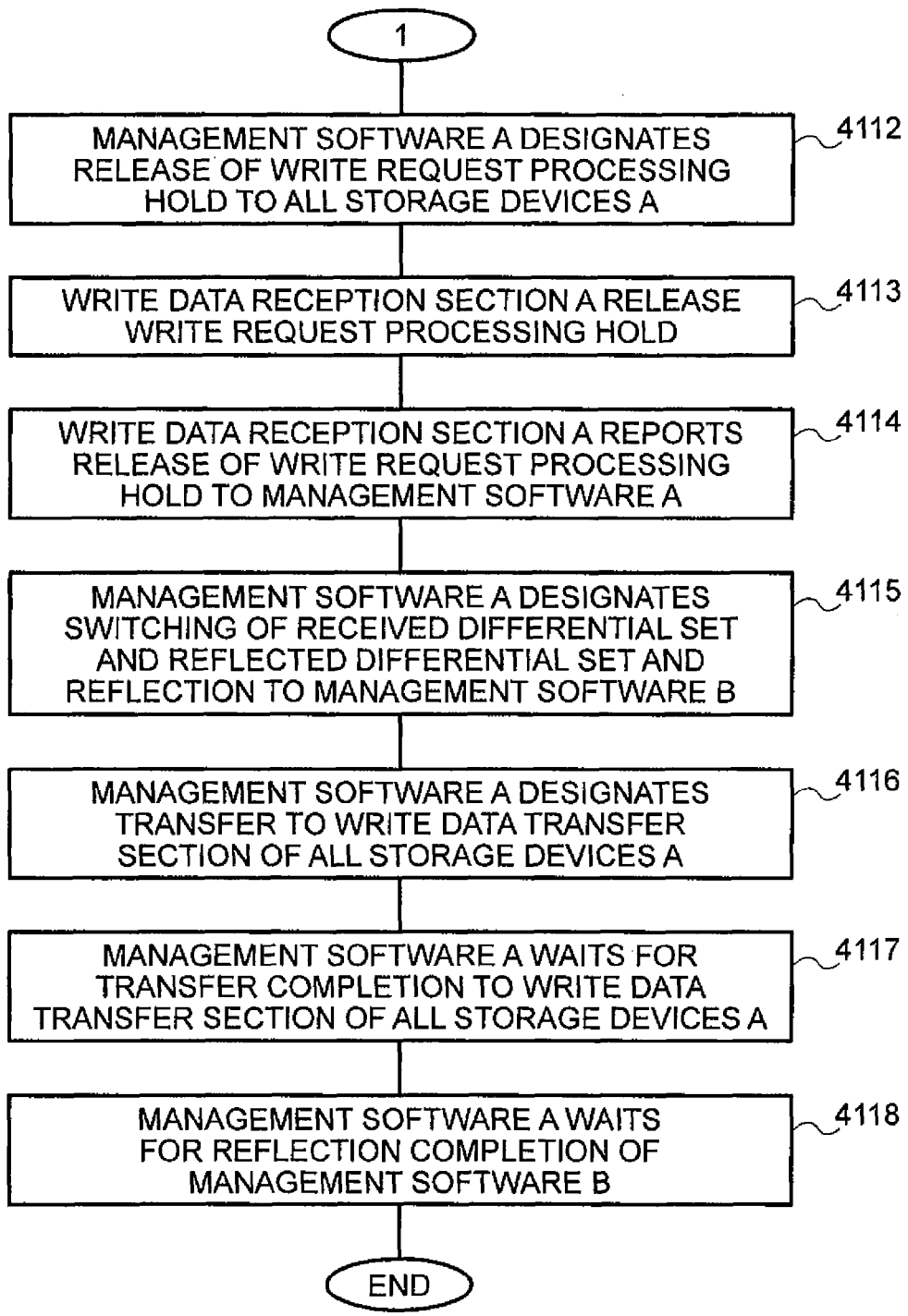
FIG. 31 shows an example of write request holding and switching processing of differential sets.

FIG. 30 and FIG. 31 are flow charts illustrating an example of temporary holding processing of a write request and switching processing of differential sets. First, the explanation will be conducted with reference to FIG. 30. At the point of time of step 4100 shown in FIG. 30, transfer of the data of the sent differential set 420 is completed in all the storage devices A100 and the values of the sent marker number information 380 of all the storage devices A100 are taken to be equal. Similarly, at the point of time of step 4100 shown in FIG. 30, the reflection of the write data managed as the reflection differential set 440 to the logical volume 500 is completed in all the storage devices B190 and the values of the arrived marker number information 370 of all the storage devices B190 are taken to be equal.

The management software A800 designates holding the write request in all the storage devices A100 (step 4100). The write data reception section A210 of each storage device A100 that received this designation holds the write request received from the MFA 600 or open system host A700 after the designation has been received (step 4101) and reports to the management software A800 that the write request was held (step 4102).

The management software A800 waits till the holding start and completion of the write request is reported from all the storage devices A100 (step 4103 and step 4104). When the reports arrive from all the storage devices A100, the management software A800 specifies a marker number that is larger by 1 than the marker number specified in the previous time and designates the update of the marker number information 360 to all the storage devices A100 (step 4105).

The marker creation section A250 of each storage device A100 that received this designation records the specified marker number in the marker number information 360 (step 4106). Furthermore, the differential set switching section A270 of each storage device A100 changes the generated differential set 410 to the sent differential information 420 and creates a new generated differential set (step 4108). Further, following the creation of the new generated differential set, the differential set switching section A270 may destroy the write data or write data management information that was heretofore the sent differential set. The marker creation section A250 of each storage device A100 then reports the update completion of the marker number information 360 to the management software A800 (step 4109).

The management software A800 waits till the update completion of the marker number information 360 is reported from all the storage devices A100 (step 4110, step 4111).

As shown in FIG. 31, when the update completion reports of marker number information 360 are obtained from all the storage devices A100, the management software A800 designates holding cancellation of the write request to all the storage devices A100 (step S4112). The write data reception section A210 of each storage device A100 that received this designation cancels the holding of the write request (step 4113) and reports to this effect to the management software A800 (step 4114).

The management software A800 then designates to the management software B890 the switching of the received differential set 430 and reflected differential set 440 and the reflection of the write data managed as the reflected differential set 440 in the logical volume 500. The processing executed by the management software B890 that received this designation and storage device B190 will be described below with reference to FIG. 33.

The management software A800 designates to the write data transfer section A220 of all the storage devices A100 the transfer of data managed as the sent differential set to the storage device B190 (step 4116). The write data transfer section A220 that received this designation executes the processing explained with reference to FIG. 28.

The management software A waits for the completion report of the transfer processing of the data designated in step 4116 and reflection processing of the data designated in step 4115 (step 4117 and step 4118). When data transfer processing is completed in all the storage devices A100 and also data reflection processing is completed in all the storage devices B190, the processing flow again returns to step 4100 shown in FIG. 30, and the processing explained with reference to FIG. 30 and FIG. 31 is repeatedly executed.

Figure 33:
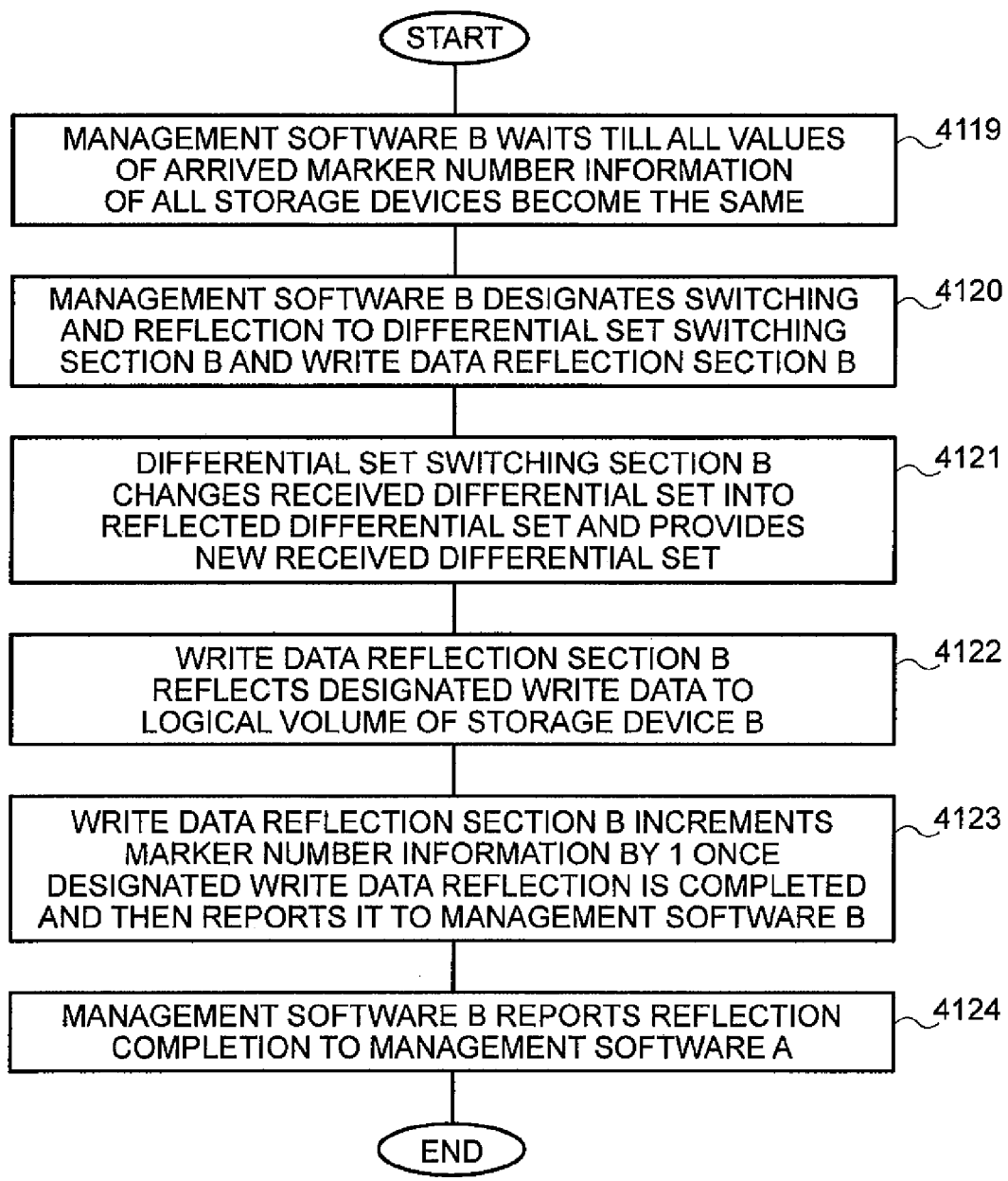
FIG. 33 shows an example of switching processing of differential sets and reflection processing of data in the storage device B190.

FIG. 33 is a flowchart illustrating an example of processing relating to the case where the management software B890 receives from the management software A800 the switching designation of the received differential set 430 and reflected differential set 440 and the reflection designation of write data to the logical volume 500.

The management software B collects the values of the arrived marker number information 370 for all the storage devices B190 and waits till those values become identical for all the storage devices B190 (step 4119). In other words, the management software B waits till the reception of data of the sent differential set 420 is completed for all the storage devices B190. In step 4119, the management software B may also collect the values of the sent marker number information 380 for all the storage devices A100 and wait till those values become identical for all the storage devices A100.

Then, the management software B designates the switching of differential sets and the reflection of write data to the logical volume 500 to the differential set switching section B271 and write data reflection section B240 of each storage device B190 (step 4120).

The differential set switching section B271 of the storage device B190 that received this designation changes the received differential set 430 to the reflected differential set 440 and provides a new received differential set 430 (step 4121). Further, following the creation of the new received differential set, the differential set switching section B271 may destroy the write data or write data management information that was heretofore the reflected differential set.

Further, the write data reflection section B240 writes the write data in the set that has newly become the reflected differential set 440 to the logical volume 500 (step 4122). The write data reflection section B240 also updates the value of the marker number information 360 of the storage device B190. Thus, the marker number recorded as the write time in the write data management information 330 of the write data to be reflected to the logical volume 500 becomes the value of the marker number information 360 of the storage device B190. In the present embodiment, this processing is executed by incrementing the value of the marker number information 360 by 1.

If all the write data of the reflected differential set 440 are reflected in the logical volume 500, the write data reflection section B240 increments the marker number information of the storage device B190 by 1 and reports the processing completion to the management software B890 (step 4123). The reporting may be also conducted via the storage device A100.

The management software B890 waits for the completion reports relating to the switching of differential sets and reflection to the logical volume 500 for all the storage devices B190 and if the completion reports are obtained from all the storage devices B190, reports to this effect to the management software A800 (step 4124).

Exchange between the management software B890 and the differential set switching section B271 or write data reflection section B240 is conducted, for example, via a network connecting the storage device A100 and storage device B190.

Here, the designation of switching of differential sets and reflection to the logical volume 500 that is sent from the management software B890 to storage devices B190 is issued for each storage device B190. Therefore, if a failure occurs in the storage device A100 while the management software B890 conducts the designation, then failure recovery sometimes cannot be conducted correctly. An example thereof is shown in FIG. 34.

Figure 34:
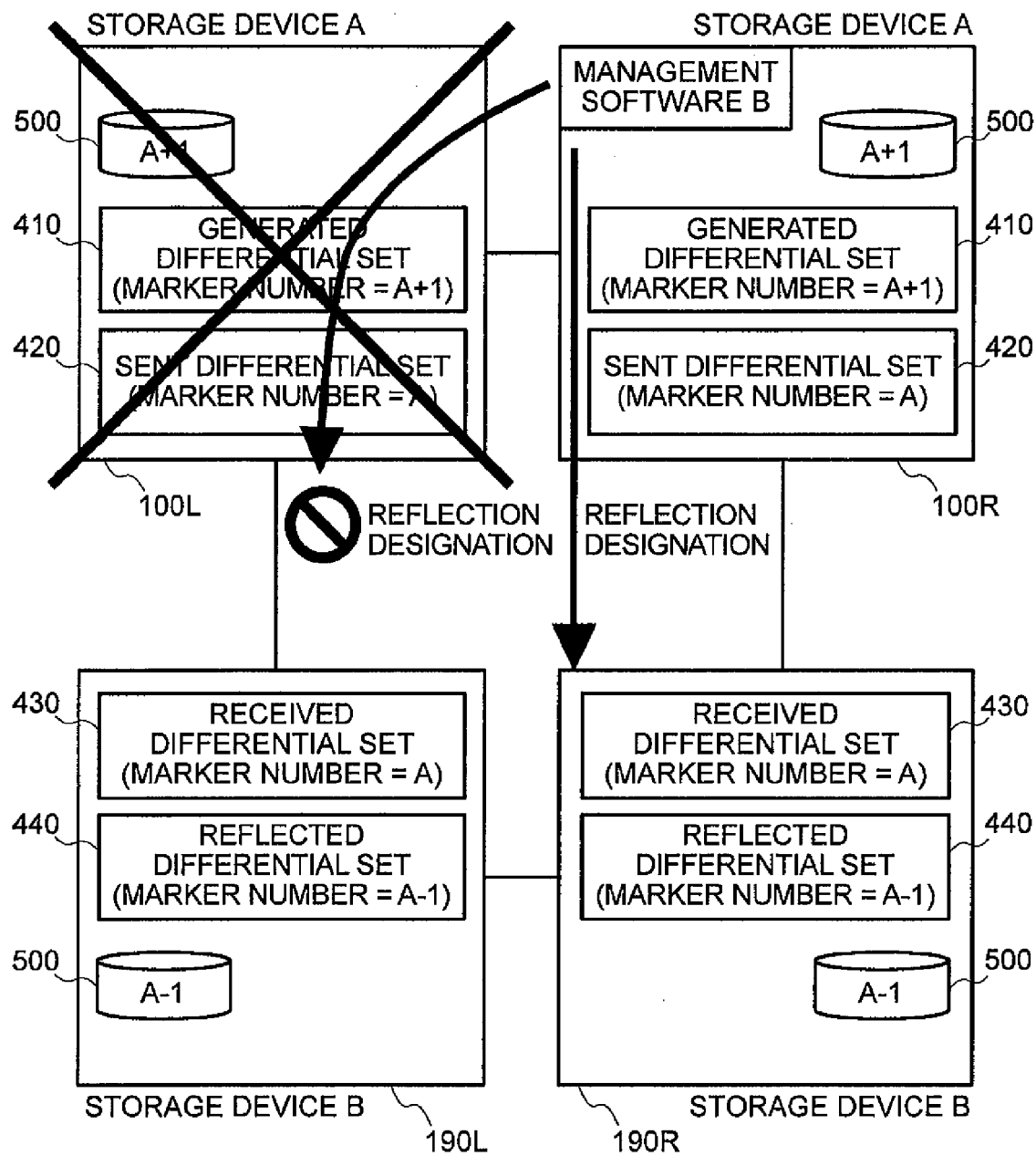
FIG. 34 shows an example of the case where a failure occurred in the storage device as a write data reflection designation was issued.

FIG. 34 illustrates the operation conducted in the case where a storage device A 100L fails and stops when the management software B890 designates the switching of differential sets and the reflection to respective storage devices B190 in step 4120 shown in FIG. 33. The case of reflection designation where the storage device A1001 failed and stopped will be described below more specifically with the following time sequence.

(1) The management software B890 located in the storage device A100R designates the reflection of the differential set with a marker number of A to the storage device B190R.

(2) The storage device A100L stops due to a failure.

(3) The management software B890 located in the storage device A100R designates the reflection of the designation set with a marker number of A to the storage device B190L via the storage device A100L. However, because the storage device A100L has stopped due to a failure, the reflection designation does not reach the storage device B190L. As a result, only the data of the logical volume 500 of the storage device B190R advance in time and the write sequence relationship is not maintained.

In order to avoid this state, a program comprising the following steps may be executed before either of the storage device B190L and storage device B190R uses the logical volume 500 of the storage device B190. Here, the case where the reflection stops in the state shown in FIG. 34 is used as an example.

(Initial state) The system waits till the data transfer of differential sets or reflection stops inside the storage device B190L and storage device B190R. At this time, the stop is in a state where the arrived marker number information of the storage device B190L is A and the differential set with a marker number of A−1 is reflected to the logical volume (in other words, the marker number information is A−1). Further, the stop is in a state where the arrived marker number information of the storage device B190R is A or A+1 and the differential set with a marker number of A is reflected to the logical volume 500 (in other words, the marker number information is A−1). Further, because the management software B 890 does not designate the reflection unless all the arrived marker numbers assume the same value, the arrived marker number information of the storage device B190L cannot assume a value less than A.

(Step A) The arrived marker number information and marker number information are collected from the storage device B190L and storage device B190R.

(Step B) The smallest number is selected from the collected arrived marker number information (referred to hereinbelow as "minimum arrived marker number"). In the present example, A is the minimum arrived marker number.

(Step C) When the marker number information of the storage device B190L is less than the minimum arrived marker number, the reflection designation is conducted with respect to the storage device B190L. In the present example, because the marker number information of the storage device B190L is A−1, the reflection is designated to the storage device B190L. Therefore, the differential set with a marker number of A is reflected to the logical volume 500 of the storage device B190L.

(Step D) When the marker number information of the storage device B190R is less than the minimum arrived marker number, the reflection designation is conducted with respect to the storage device B190L. In the present example, because the marker number information of the storage device B190R is A, the reflection is not designated and the state in which the differential set with a marker number of A was reflected to the logical volume 500 of the storage device B190L remains unchanged.

Common processing with the management software B890 may be conducted by executing the above-described step A, step B, and step C instead of step 1119 and step 4120 shown in FIG. 33.

The management software A800 and management software B890 may be present in the MFA 600, open system host A700, MFB 690, open system host B790, and storage device B190, rather than in the storage device A100. In this case, the setting interface for the management software A800 and management software B890 is assumed to be present in the computer where the management software A800 and management software B890 are present, but setting may be also conducted from other places. Further, an interface for issuing the designation from the management software A800 or management software B890 and an interface for the management software A800 or management software B890 to collect information may be provided from the storage device A100 or storage device B190.

In the present embodiment, write data contained in the differential set were managed by using write data management information. However, they may be also managed by other methods. For example, write data contained in the differential set may be managed, for example, by preparing for each differential set a differential bit map, which is the information indicating the present or absence of difference in data for each address block and using this differential bit map.

Further, in the above-described embodiment, each storage device executed the transfer of data of the sent differential set, switching of the received differential set 430 and reflected differential set 440, and reflection processing of data of the reflected differential set 440 on occasion of each separate designation, but those types of processing may be also conducted together in the following sequence based on one designation.

(1) Reflection processing accompanied by switching the received differential set 430 and reflected differential set 440.

(2) Data transferring the sent differential set.

(3) Waiting and reporting completion of (1) and (2).

In Embodiments 1 to 6 hereinabove, a case was explained as an example where both the mainframe host and the open system host were connected to the storage device A 100 or storage device B190. However, those embodiments can be implemented when only the mainframe host is connected. Furthermore, Embodiments 3 to 6 can be also implemented when only the open system host is connected.

What is claimed is:

1. A system comprising:
a plurality of first storage devices each connected to a host computer; and
a plurality of second storage devices each connected to any of the first storage devices, wherein each of said plurality of first storage devices is configured to defer processing of a write request received from the host computer based on an instruction from a management unit and to restart thereafter processing of the write request received from the host computer based on the instruction from said management unit;

wherein each of said plurality of first storage devices is configured to manage as a write data set write data of the write request processed after processing of the write request has been restarted according to the instruction from said management unit until processing of the write request is deferred according to an instruction from said management unit;

wherein said management unit is configured to receive a completion report of deferring processing of the write request from said plurality of first storage devices and then to instruct said plurality of first storage devices to create new write data sets, to attach common identification information to the write data set created in said plurality of first storage devices, and then to instruct said plurality of first storage devices to restart the processing of the write request;

wherein each of said plurality of second storage devices is configured to store the write data received from the first storage device for each write data set in logical volumes of said second storage devices and said plurality of second storage devices store the write data of the write data set having the same identification information in logical volumes of said second storage devices based on the instruction from said management unit;

wherein said management unit is configured to receive a completion report of deferring the processing of the write request from said plurality of first storage devices and then to instruct said plurality of first storage devices to send the write data to any of said plurality of second storage devices with respect to a write data set containing the write data of the write request processed by each of the plurality of first storage devices before the deferring of the processing of said write request is executed;

wherein each of said plurality of second storage devices has a cache memory and is configured to store the write data received from any of the first storage devices in said cache memory;

wherein said management unit, after said plurality of first storage devices have completed sending the write data relating to said write data set, instructs said plurality of second storage devices to store the write data of said write data set stored in said cache memory in logical volumes of the second storage devices; and wherein any of said plurality of first storage devices has said management unit.

2. The system according to claim 1, wherein each of said plurality of second storage devices is configured to record in the memory of said second storage devices the identification information attached to a write data set when the reception of the write data of the write data set is completed, and wherein said management unit collects the identification information recorded in said memory from said plurality of second storage devices and, when the values of the collected identification information coincide, instructs to store the write data of said write data set stored in said cache memory in the logical volumes of the second storage devices.

3. The system according to claim 2, wherein when sending the write data of a write data set to any of the second storage devices, each of said plurality of first storage devices conveys the identification information attached to said write data set to said second storage device.

4. The system according to claim 3, wherein each of said plurality of first storage devices is configured to create, with respect to write data received according to the write request from the host computer, write data management information comprising identification information of a write data set to which the write data belongs; and wherein when the write data of the write data set is sent to any of the second storage devices, the write data management information of the write data is also sent to said second storage device.

5. The system according to claim 1, wherein said plurality of first storage devices are configured to record in the memory of said first storage devices the identification information attached to a write data set when the sending of the write data of the write data set is completed, and wherein said management unit collects the identification information recorded in said memory from said plurality of first storage units and, when the values of the collected identification information coincide, instructs to store the write data of said write data set stored in said cache memory of each of the plurality of second storage devices in the logical volumes of said second storage devices.

6. The system according to claim 1, wherein each of said plurality of first storage devices is configured to manage the newest write data as write data belonging to a write data set when a plurality of write requests to overlapping addresses are processed within the interval after the processing of the write request has been restarted according to the instruction from said management unit till the processing of the write request is then deferred according to the instruction from said management unit.

7. The system according to claim 6, wherein each of said plurality of first storage devices stores the write data belonging to the write data set in a cache memory and is configured to update the write data on the cache memory with respect to the overlapping portion of addresses when a plurality of write requests to the overlapping addresses are received within the interval after the processing of the write request has been restarted according to the instruction from said management unit till the processing of the write request is then deferred according to the instruction from said management unit.

8. A remote copying method executed between a plurality of first storage devices each connected to a host computer and a plurality of second storage devices each connected to any of the first storage devices, said method comprising the steps of:

each of said plurality of first storage devices managing the write data received from the host computer as a first write data set;

each of said plurality of first storage devices deferring the processing of the write data received from the host computer based on the instruction from a management unit and reporting completion of the change from said first write data set into a second write data set to said management unit;

the management unit receiving a completion report of the processing of the write request from said plurality of first storage devices, and then instructing said plurality of first storage devices to change said first write data set into a second write data set and to create a new first write data set;

said plurality of first storage devices changing said first write data set into the second write data set based on the instruction from said management unit, preparing for managing the new first write data set, and reporting to this effect to said management unit;

said management unit instructing said plurality of first storage devices to cancel deferring of the processing of the write request after receiving the reports from said plurality of first storage devices;

said plurality of first storage devices canceling the deferring of the processing of the write request based on the instruction from said management unit and managing the write data of the write requests to be subsequently processed as a new first write data set;

each of said plurality of first storage devices sending the write data of said second write data set to any of said second storage devices based on the instruction from said management unit;

each of said plurality of second storage devices managing the write data received from any of the first storage devices as write data belonging to a third write data set; and each of said plurality of second storage devices changing said third write data set into a fourth write data set based on the instruction from said management unit and storing the write data belonging to said fourth write data set in logical volumes of the second storage devices, wherein any of said plurality of first storage devices has said management unit.

* * * * *